US012576423B2

(12) United States Patent
Tinkler et al.

(10) Patent No.: US 12,576,423 B2
(45) Date of Patent: Mar. 17, 2026

(54) DISPENSER

(71) Applicant: medmix Switzerland AG, Haag (CH)

(72) Inventors: Mark Tinkler, Hamshire (GB); Matt Lyndon, Hampshire (GB); Michael Mann, Wiltshire (GB)

(73) Assignee: medmix Switzerland AG, Haag (CH)

( * ) Notice: Subject to any disclaimer, the term of this patent is extended or adjusted under 35 U.S.C. 154(b) by 483 days.

(21) Appl. No.: 18/272,753

(22) PCT Filed: Jan. 18, 2022

(86) PCT No.: PCT/EP2022/050956
§ 371 (c)(1),
(2) Date: Jul. 17, 2023

(87) PCT Pub. No.: WO2022/152926
PCT Pub. Date: Jul. 21, 2022

(65) Prior Publication Data
US 2024/0091806 A1 Mar. 21, 2024

(30) Foreign Application Priority Data
Jan. 18, 2021 (EP) .................................... 21152169

(51) Int. Cl.
*B05C 17/01* (2006.01)
*B05C 17/005* (2006.01)

(52) U.S. Cl.
CPC .... *B05C 17/0126* (2013.01); *B05C 17/00553* (2013.01); *B05C 17/00596* (2013.01)

(58) Field of Classification Search
CPC ........... B05C 17/0123–0126; B05C 17/00596; B05C 17/00553; A61B 17/8822
See application file for complete search history.

(56) References Cited

U.S. PATENT DOCUMENTS 4,840,294 A * 6/1989 Ernst .................. B05C 17/0123 222/391
5,137,181 A 8/1992 Keller
(Continued)

FOREIGN PATENT DOCUMENTS

CN 101444772 A 6/2009
EP 0486455 A2 5/1992
(Continued)

OTHER PUBLICATIONS

Office Action received for Taiwan Patent Application No. 111101856, mailed on May 13, 2025, 19 pages (with English Translation of Categories of Cited Documents).
(Continued)

*Primary Examiner* — Frederick C Nicolas
*Assistant Examiner* — Randall A Gruby
(74) *Attorney, Agent, or Firm* — Spencer Fane, LLP

(57) ABSTRACT

A dispenser for dispensing materials includes a dispenser body, a driving rod movable relative to the dispenser body and into the receptacle, a trigger lever having an actuation member for displacing the driving rod upon rotation of the trigger lever around a rotation axis, and a pivot member that rotatably connects the trigger lever to the dispenser body and defines the rotation axis. The pivot member is movably connected to the trigger lever such that a lever distance between the rotation axis and the actuation member changes upon movement of the pivot member relative to the trigger lever. The dispenser includes an adjustment mechanism for adjusting a mechanical advantage of the trigger lever by changing the lever distance and to adjustably fix the lever distance to at least a minimum distance and a maximum distance.

20 Claims, 32 Drawing Sheets

(56) References Cited

U.S. PATENT DOCUMENTS

| | | | |
|---|---|---|---|
| 5,211,312 A | 5/1993 | Chang | |
| 5,323,931 A | 6/1994 | Robards, Jr. et al. | |
| 5,381,931 A | 1/1995 | Chang | |
| 6,089,412 A * | 7/2000 | Snell | B05C 17/01 222/391 |
| 6,439,439 B1 * | 8/2002 | Rickard | B05C 17/01 222/391 |
| 6,672,489 B1 * | 1/2004 | Huang | G01F 11/026 222/391 |
| 8,672,193 B2 * | 3/2014 | Vukic | B05C 17/0123 222/326 |
| 10,668,498 B1 | 6/2020 | Hung | |
| 10,814,347 B2 | 10/2020 | Xia et al. | |
| 11,253,887 B1 * | 2/2022 | Hung | B05C 17/0123 |
| 11,691,174 B2 * | 7/2023 | Poppe | B05C 17/0123 222/251 |
| 12,370,572 B2 * | 7/2025 | Zhang | B05C 17/01 |
| 2002/0092871 A1 | 7/2002 | Rickard et al. | |
| 2009/0134187 A1 | 5/2009 | Hefele | |
| 2013/0161360 A1 * | 6/2013 | Marsden | B05C 17/0123 222/391 |
| 2017/0348724 A1 | 12/2017 | Hung | |
| 2024/0009699 A1 * | 1/2024 | Li | B05C 17/014 |

FOREIGN PATENT DOCUMENTS

| | | |
|---|---|---|
| EP | 0736333 A2 | 10/1996 |
| EP | 0736333 B1 | 7/1999 |
| GB | 1011470 | 11/1963 |
| TW | 202033281 A | 9/2020 |
| WO | 2020187852 A1 | 9/2020 |

OTHER PUBLICATIONS

International Search Report issued Jul. 27, 2023 in corresponding International Application No. PCT/EP2022/050956.

* cited by examiner

DISPENSER

CROSS-REFERENCE TO RELATED APPLICATION

This application is a U.S. National State application of International Application No. PCT/EP2022/050956, filed Jan. 18, 2022, which claims priority to European Patent Application No. 21152169.5, filed Jan. 18, 2021, the contents of each of which are hereby incorporated by reference.

BACKGROUND

Technical Field

The present disclosure relates to a dispenser for dispensing materials from a container.

Background Information

Conventional dispensers can be used to apply materials from containers or cartridges in various applications, such as dental, adhesive, caulking or construction applications. Depending on the dispensed material, these dispensers receive containers that have one or more compartments, each compartment containing a material component. The material is usually urged from the containers by one or more driving rods that move a plunger within the containers towards a distal dispensing end of the container. Depending on the application, material components from different containers can be mixed by static or dynamic mixers attached to the dispensing end of the containers.

Especially when being configured as manual devices, dispensers usually comprise a trigger lever that is pressed by a user of the device to advance the driving rod into the container and to urge the material from the container. Such trigger levers are usually constructed as first-class levers that are hinged to a body of the dispenser and pivot around a rotation axis when being squeezed. This causes an actuation member, such as a drive pin, to move along the driving rod and to advance the driving rod, for example through engagement with a catch plate provided at the driving rod.

SUMMARY

The force that is exerted on the driving rod when pushing the trigger lever and thus the force with which the material is urged out of the container depends on the construction of the trigger lever, in particular on its mechanical advantage. Depending on the viscosity of the material to be dispensed, different types of dispensers are usually in use, each having a mechanical advantage that is adapted to a given range of viscosity. For general do-it-yourself applications the mechanical advantage is typically lower than with dispensers for professional and specialist applications. Due to these differences in mechanical advantage, it has been discovered that it is usually necessary to provide several types of dispensers when working with a multitude of materials having different viscosity, causing high cost and material expenditure.

Accordingly, there is a need to provide dispensers that are suited to be used with a wide range of different materials.

The present disclosure provides a dispenser as set forth in the description and the drawings.

The present disclosure is directed at a dispenser for dispensing materials, comprising a dispenser body having a receptacle for a container that holds the material, a driving rod movable relative to the dispenser body along a longitudinal axis and into the receptacle, a trigger lever having an actuation member for displacing the driving rod along the longitudinal axis upon rotation of the trigger lever around a rotation axis, and a pivot member that rotatably connects the trigger lever to the dispenser body and defines the rotation axis. The pivot member is movable, for example slideably, connected to the trigger lever in such a way that a lever distance between the rotation axis and the actuation member changes upon movement of the pivot member relative to the trigger lever. Furthermore, the dispenser comprises an adjustment mechanism for adjusting a mechanical advantage of the trigger lever by changing the lever distance, wherein the adjustment mechanism is configured to adjustably fix the lever distance to at least a minimum distance and a maximum distance. Furthermore, a position of the actuation member relative to the driving rod and/or the dispenser body does not change with changing lever distance.

Having a pivot member that is movable connected to the trigger lever and an adjustment mechanism for adjusting the lever distance between the pivot member and the actuation member, the dispenser according to the present disclosure is configured to be adapted to a wide range of materials having different viscosity. With the adjustment mechanism, the dispensing ratio, that is the ratio of the distance of movement of the driving rod to the distance of movement of the trigger lever per actuation of the trigger lever, and thus also the force exerted on the material within the container can be varied.

Furthermore, the adjustment mechanism is configured to maintain the position of the actuation member relative to the driving rod and/or the dispenser body w % ben the lever distance changes. Having a fixed position of the actuation member irrespective of the lever distance allows for the actuation member to engage with the driving rod or with a driving member connected to the driving rod at a fixed position or contact area. Therefore, the kinematics used to transfer forces from the actuation member to the driving rod does not change with changing lever distance and the driving rod can be reliably actuated irrespective of the lever distance.

The pivot member can be movable with respect to both the trigger lever and the dispenser body. During dispensing of the material, the pivot member can then have a fixed position with respect to the trigger lever and/or the dispenser body. For example, the pivot member can be movable, such as displaceable, with respect to the trigger lever and non-displaceable with respect to the dispenser body during dispensing. In this case, the adjustment mechanism can be provided at the dispenser body. Alternatively, the pivot member can be non-displaceable or fixed with respect to the trigger lever and movable, such as displaceable, with respect to the dispenser body during dispensing. In this case, the adjustment mechanism can be provided at the trigger lever.

The actuation member can be configured as an integral part of the trigger lever, such as a surface element or protrusion of the trigger lever. Alternatively, it can also be configured as a separate component that is attached to the trigger lever.

The actuation member can be configured to displace the driving rod along the longitudinal axis via a clamping member, such as a catch plate, that clamps the driving rod w % ben being actuated towards a dispensing end of the receptacle and that releases from the driving rod when being moved in the opposite direction. The clamping member can be configured to advance the driving rod by clamping the driving rod upon tilting perpendicular to the longitudinal axis. The actuation member can be configured as a drive pin that exerts a force parallel to the longitudinal axis on the clamping member upon actuation of the trigger lever.

The clamping member can be formed from a metal material, for example as a sintered component or as a pressed strip, such as a pressed steel strip. Likewise, the actuation member can also be formed from a metal material, for example from steel. The actuation member can be configured as a metal rod.

In general, the actuation member can be configured to displace the driving rod along the longitudinal axis via a driving member that engages, for example releasably engages, with the driving rod. Such an actuation member can, for example be the clamping member. It can also be configured as a ratcheting element or the like.

The dispenser can be configured as a manual dispenser. It can have a receptacle that is configured for receiving single compartment containers or it can have a receptacle configured for receiving multiple compartment containers, such as dual compartment containers, i.e. for 1K and 2K cartridges. The dispenser can comprise one driving rod per compartment, such as a single driving rod when being adapted to receive single compartment containers, or several driving rods when being adapted to receive multiple compartment containers. With a dispenser having several driving rods, the individual driving rods can simultaneously move upon actuation of the trigger lever.

According to an embodiment, the adjustment mechanism is configured to fix the lever distance to one or more intermediate distances between the minimum and maximum distance. For example, the adjustment mechanism can be configured to fix the lever distance to any intermediate distance between the minimum and maximum distance for continuous variation of the mechanical advantage. This allows for flexible adaption of the mechanical advantage of the trigger lever to the processing of materials with varying viscosity.

According to an embodiment, the adjustment mechanism is configured to adjust the mechanical advantage to a range between 7:1 and 24:1, for example to a range between 12:1 and 24:1, by changing the lever distance. These ranges cover both ratios that are typically used in do-it-yourself applications, such as 7:1, and ratios that are used in professional and specialist applications, such as 24:1. The adjustment mechanism can be configured to adjust the mechanical advantage to a minimum ratio of 3:1, 5:1, 7:1 or 12:1. Furthermore, the adjustment mechanism can be configured to adjust the mechanical advantage to a maximum ratio of 15:1, 20:1, 24:1 or 30:1.

According to an embodiment, the pivot member is slideably connected to the dispenser body. For example, the pivot member can be configured to slide with respect to the dispenser body during adjustment of the lever distance. This provides a simple mechanism for adjusting the lever distance while keeping the relative position between the actuation member and the driving rod and/or the dispenser body.

According to an embodiment, the pivot member comprises at least one connection element, such as at least one connection pin, that is slideably received in an elongated slot of the dispenser body. The pivot member is therefore movable with respect to the dispenser body along the slot while its movement is simultaneously restricted in a direction perpendicular to the slot. This allows both for easy adjustability of the lever distance and for mechanical rigidity during operation.

The slot can, for example, be disposed at an inner surface of the dispenser body. It can be configured as a recess of a surface of the dispenser body or it can be formed at an additional structure, such as at a protruding structure, provided at a surface of the dispenser body.

According to an embodiment, the pivot member is configured to be displaced with respect to the dispenser body during actuation of the trigger lever. For example, the pivot member can be displaceably hinged to the dispenser body during actuation of the trigger lever. A displaceable pivot member enables simple compensation of movement of the actuation member that deviates from a pure rotation with respect to the dispenser body. Such movement can, for example, result from a longitudinal movement of the driving rod. For example, the actuation member can be configured or forced to follow a tilting movement and/or a translation of a driving member for advancing the driving rod along the longitudinal axis, such as a clamping member.

In general, the pivot member can be movable, for example slideably, connected to the dispenser body.

According to an embodiment, the pivot member is movable, such as displaceable, in a moving direction that has an angle with the longitudinal axis, wherein, for example, the moving direction of the pivot member is at least essentially perpendicular to the longitudinal axis and/or the rotation axis. The pivot member can then move along the moving direction during adjustment of the lever distance. The moving direction can, for example, run along the elongated slot of the dispenser body. The moving direction can be perpendicular to both the longitudinal axis and the rotation axis along a perpendicular axis. The perpendicular axis can also be denoted as vertical axis.

According to an embodiment, the trigger lever has a connection to the driving rod, for example via the actuation member, that limits perpendicular movement of the trigger lever along the perpendicular axis perpendicular to the longitudinal axis and perpendicular to the rotation axis. This enables a firm connection between the trigger lever and the dispenser body despite of the pivot member being movable, such as displaceable, connected to the trigger lever. In addition, a position of the actuation member relative to the driving rod along the perpendicular axis is also limited, which helps to ensure well-defined mechanical properties of the interaction between the actuation member and the driving rod, for example via the driving member or clamping member. The connection of the trigger lever to the driving rod can, for example, limit the range of contact positions of the actuation member on the driving member or clamping member.

According to an embodiment, the connection of the trigger lever to the driving rod is separate from the pivot member. In this way, the perpendicular movement of the trigger lever is limited with respect to the driving rod irrespective of whether the pivot member is allowed to move with respect to the driving rod or not. In particular, a displacement of the pivot member with respect to the driving rod is allowed while perpendicular movement of the trigger lever with respect to the driving rod is restricted.

According to an embodiment, the perpendicular movement of the trigger lever relative to the driving rod is limited via a connection member that is connected to the driving rod. The connection member can, for example, engage with the actuation member of the trigger lever. For example, the connection member can receive the actuation member in a seat, such as a slot, recess, hole or the like.

The connection member can be connected to the driving rod by surrounding the driving rod to limit movement of the connection member along the perpendicular axis. For example, the connection member can receive the driving rod in a rod opening. The rod opening can run at least essentially parallel to the longitudinal axis.

According to an embodiment, the connection member is movably attached to the driving rod. For example, the connection member can be movable along the longitudinal axis. Thereby, its movement can be limited by engagement with the clamping member used to advance the driving rod along the longitudinal axis.

With some embodiments, the connection member and the driving member or clamping member can be configured as separate elements of the dispenser. Additionally, these elements can be formed from different materials. For example, the diving member or clamping member can be formed from a metal material and/or the connection member can be formed from a plastic material.

The connection member can contact or rest against the driving member or clamping member. The connection member can, for example, be urged towards the driving member or clamping member by a spring element, such as a spring element surrounding the driving rod. Additionally or alternatively, the connection member can also at least partly surround the driving member or clamping member.

With other embodiments, the connection member can be integrally formed with the driving member or clamping member. For example, the driving member or clamping member can have a connection element that is integrally formed with the driving member or clamping member and that receives the actuation member in a seat, for example in an opening.

The connection member can be configured to tighten the trigger lever towards the driving rod. This enables a sturdy connection between the trigger lever and the dispenser body and helps to reduce play in the connection between the trigger lever and the dispenser body via the movable pivot member.

The connection member can be, for example, spring-loaded to advance the trigger lever towards the driving rod so that the trigger lever can only be moved away from the driving rod against a restoring force provided by the spring-loaded connection member. This restoring force can be generated by the connection member rocking around a rocking axis parallel to the rotation axis against a biasing member, such as a spring, pushing the connection member along the longitudinal direction, for example towards the driving member or clamping member.

According to an embodiment, the dispenser comprises a clamping member, such as a catch plate, that is configured to advance the driving rod by clamping the driving rod upon tilting around a tilt axis perpendicular to the longitudinal axis, for example upon tilting around a tilt axis parallel to the rotation axis of the trigger lever.

The clamping member or generally the driving member can be configured to receive a force transmitted by the actuation member at a fixed location during operation of the trigger lever. By this way, the kinematics used to transfer forces from the actuation member to the driving member or clamping member, for example a mechanical advantage realized upon pushing the driving member or clamping member by the actuation member, does not change during actuation of the trigger lever. Furthermore, excessive wear of the driving member or clamping member due to a sliding movement of an element that transfers the force to the driving member or clamping member, such as a roller or the actuation member itself, is avoided.

The actuation member can directly contact the driving member or clamping member. This allows for a simple construction of a drive mechanism for advancing the driving rod. The actuation member can also contact the driving member or clamping member via a roller that is rotatably mounted on the actuation member. This reduces wear between the actuation member and the driving member or clamping member as the roller can roll along the driving member or clamping member when the trigger lever is actuated and the actuation member moves with respect to the driving member or clamping member.

The actuation member can be attached to the driving rod via a roller holder that receives the actuation member in at least one receptacle and that restrains the position of the roller with respect to the driving member or clamping member. Such a roller holder can form the connection member that limits movement of the trigger lever with respect to the driving rod along the perpendicular axis.

According to an embodiment, the actuation member is non-displaceably connected to the driving member or clamping member. This provides a simple implementation of a dispenser in which the driving member or clamping member receives the force transmitted by the actuation member at the fixed location. While being non-displaceably connected to the driving member or clamping member, the actuation member can be free to rotate with respect to the driving member or clamping member.

According to an embodiment, the actuation member is non-displaceably connected to the driving member or clamping member via a connection member that is fixedly connected to the clamping member, for example via a snap-on connection.

According to an embodiment, a movement of the actuation member with respect to the dispenser body during actuation of the trigger lever deviates from a pure rotation around the rotation axis. In this way, the actuation member can follow the longitudinal movement of the piston rod and/or a tilting motion of a driving member, such as the clamping member, that advances the piston rod.

According to an embodiment, the rotation axis defined by the pivot member is displaceable with respect to the dispenser body and/or the actuation member during actuation of the trigger lever. This provides a simple implementation of a dispenser in which the movement of the actuation member deviates from a pure rotational movement.

According to an embodiment, the pivot member is movable with respect to the trigger lever during operation of the trigger lever, for example along the perpendicular axis. This allows for compensation of length variations in the distance between the pivot member and the actuation member, for example during movement of the clamping member of the dispenser.

According to another embodiment, the pivot member is fixed with respect to the actuation member during operation of the trigger lever. This provides a sturdy and reliably connection.

According to an embodiment, the adjustment mechanism is supported at the trigger lever and is configured to restrain movement of the pivot member relative to the trigger lever. For example, the adjustment mechanism can fix the pivot member to the trigger lever during operation of the trigger lever.

According to an embodiment, the adjustment mechanism comprises a threaded rod which acts between the pivot member and the actuation member and moves the pivot member relative to the actuation member. This provides a simple adjustable connection between the pivot member and the actuation member.

The threaded rod can be configured to rotate with respect to the pivot member and/or the actuation member upon changing the lever distance. Rotation of the threaded rod can, for example, be caused by actuating a rotatable control member, such as a control wheel. The control member can be non-rotatably connected to the threaded rod. In particular, the control member can be rotationally and translationally fixed to the threaded rod. The threaded rod can interact with a threading that is fixedly connected to the pivot member or the actuation member.

The threaded rod can also be configured to remain rotationally fixed with respect to the pivot member and/or the actuation member upon changing the lever distance. Furthermore, the threaded rod can be configured to be translated with respect to one of the pivot member and the actuation member upon changing the lever distance. Translation of the threaded rod can, for example, be caused by actuating a rotatable control member, such as a control wheel. The control member can, for example, be rotatably, such as threadedly, connected to the threaded rod.

According to an embodiment, the adjustment mechanism is supported at the dispenser body and is configured to restrain movement of the pivot member relative to the dispenser body. Such a configuration allows for easy accessibility of the adjustment mechanism, for example for easy accessibility of a control member of the adjustment mechanism, which can also be provided at the dispenser body.

According to an embodiment, the adjustment mechanism comprises an adjustable restraining member, which is configured to define a position of the pivot member with respect to the dispenser body, for example along the perpendicular axis.

The adjustable restraining member can be configured to move relative to the dispenser body during adjustment, for example perpendicular to the longitudinal axis, such as along the perpendicular axis. The adjustable restraining member can be connected, for example via a threaded bar, to a control member, such as a rotatable control member. The control member can be configured to cause movement of the adjustable restraining member upon actuation and to define the position of the restraining member. The control member can be provided at the dispenser body.

The adjustment member can receive the pivot member in a support for restraining movement of the pivot member. It can limit movement perpendicular to the longitudinal axis in one dimension, for example by an elongated support, or in two dimensions, for example by a round support. The adjustment member or support can, for example, surround the pivot member to limit movement of the pivot member in two dimensions.

The restraining member can have, for example, a first longitudinal support, such as a first slot, and the dispenser body can have a second longitudinal support, such as the elongated slot at the dispenser body, that both receive the pivot member, wherein the first longitudinal support and the second longitudinal support have an angle with respect to each other and wherein an overlapping area of the first and second support defines the position of the pivot member with respect to the dispenser body.

The restraining member can, for example, be configured as a control plate. The control plate can be pivotally supported at the dispenser body via a control plate pivot and the control plate can further be adjustably connected to the dispenser body via a control mechanism that is configured to fix the rotational position of the control plate around the control plate pivot.

The control plate can also be slideably connected to the dispenser body along a moving direction and the moving direction can have an angle with the longitudinal support of the restraining member and with the longitudinal support of the dispenser body. The sliding position of the control plate can, for example, be adjustable via a control mechanism having a control element provided at the dispenser body.

According to an embodiment, the restraining member is slideably connected to the dispenser body along a moving direction. A slidable connection to the dispenser body allows for easy adjustment of the restraining member. The moving direction can be, for example, parallel to a moving direction of the pivot member with respect to the dispenser body. With other embodiments, the moving direction can have an angle with the moving direction of the pivot member along the dispenser body.

With alternative embodiments, the adjustment mechanism can also be supported at the trigger lever and can be configured to restrain movement of the pivot member relative to the trigger lever. With these embodiments, the pivot member can be movable with respect to the dispenser body during actuation of the trigger lever.

According to an embodiment, the adjustment mechanism comprises a control member, such as a rotatable control member, to adjust the lever distance, wherein, for example, the control member is located at the dispenser body, such as at a top side of the dispenser body opposite to a bottom side of the dispenser body at which the trigger lever is arranged.

The control member can be configured to move the restraining member upon actuation and to define a position of the restraining member. For example, when being configured as a rotatable control member, the control member can be configured to move the restraining member upon rotation. The control mechanism can further comprise a threaded rod that moves the pivot member relative to the actuation member upon rotation of the control member, for example by moving the restraining member.

The control member can be configured as a control knob, for example as a rotatable control knob, a rotatable control wheel, a control slider, a control lever, or the like.

The control member can also be configured as a rotatable collar that can move the restraining member upon rotation. Thereby, the collar can, for example, engage with the restraining member via a cam mechanism. The rotatable collar can be located, for example, around the driving rod.

The control element can be placed at one of a top side of the dispenser body and a bottom side of the dispenser body, with the top side and the bottom side being located at opposite sides of the driving rod and the trigger lever being arranged at the bottom side of the dispenser body.

The control element can also be located at the dispenser body at a distal dispensing side from the trigger lever or at a proximal rear side from the trigger lever, which is opposite to the dispensing side.

In another aspect, the present disclosure is also directed at dispensers that do not feature an adjustment mechanism for adjusting the mechanical advantage of the trigger lever but in which the trigger lever and/or actuation member has a connection to the driving rod that is separate from a pivot member connecting the trigger lever to the dispenser body.

Accordingly, the present disclosure is also directed at a dispenser for dispensing materials, comprising a dispenser body having a receptacle for a container that holds the material, a driving rod movable relative to the dispenser body along a longitudinal axis and into the receptacle, a trigger lever having an actuation member for displacing the driving rod along the longitudinal axis upon rotation of the trigger lever around a rotation axis, and a pivot member that rotatably connects the trigger lever to the dispenser body and defines the rotation axis. The actuation member thereby has a connection to the driving rod, wherein the connection is separate from the pivot member.

Such a connection of the actuation member to the driving rod restricts or fixes a position of the actuation member relative to the driving rod, for example along the perpendicular axis, which helps to ensure well-defined mechanical properties of the interaction between the actuation member and the driving rod, for example via a driving member or a clamping member. The connection of the actuation member to the driving rod can, for example, limit the range of contact positions of the actuation member on the driving member or clamping member.

According to an embodiment, a perpendicular movement of the actuation member and/or the trigger lever along the perpendicular axis with respect to the driving rod can be limited by the connection of the actuation member to the driving rod.

The pivot member can be displaceably connected to the trigger lever and/or actuation member during actuation of the trigger lever, for example, via a holding element that is configured to move with respect to the trigger lever during actuation of the trigger lever. Additionally, the pivot member can be non-displaceably connected to the dispenser body during actuation of the trigger lever.

The pivot member can be non-displaceably connected to the trigger lever and/or actuation member during actuation of the trigger lever. Additionally, the pivot member can be displaceably connected to the dispenser body during actuation of the trigger lever. For example, the pivot member can be displaceably guided at the dispenser body, for example in an elongated slot.

In general, the pivot member can be non-displaceably connected to one of the trigger lever and the dispenser body and displaceably connected to the other one of the trigger lever and the dispenser body during actuation of the trigger lever. With other embodiments, the pivot member can be non-displaceably connected to both the trigger lever and the dispenser body during actuation of the trigger lever.

The connection of the actuation member to the driving rod can be configured to allow for a restricted displacement of the actuation member with respect to the driving rod during actuation of the trigger lever, for example along the perpendicular axis and/or the longitudinal axis.

The connection of the actuation member to the driving rod can, for example, be provided by a connection member according to the present disclosure. The connection member can be configured as a roller holder according to the present invention, or by any other embodiment of the connection member according to the present disclosure. In addition, all further embodiments that are disclosed in connection with dispensers having the adjustment mechanism according to the present disclosure also apply to the foregoing embodiments.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
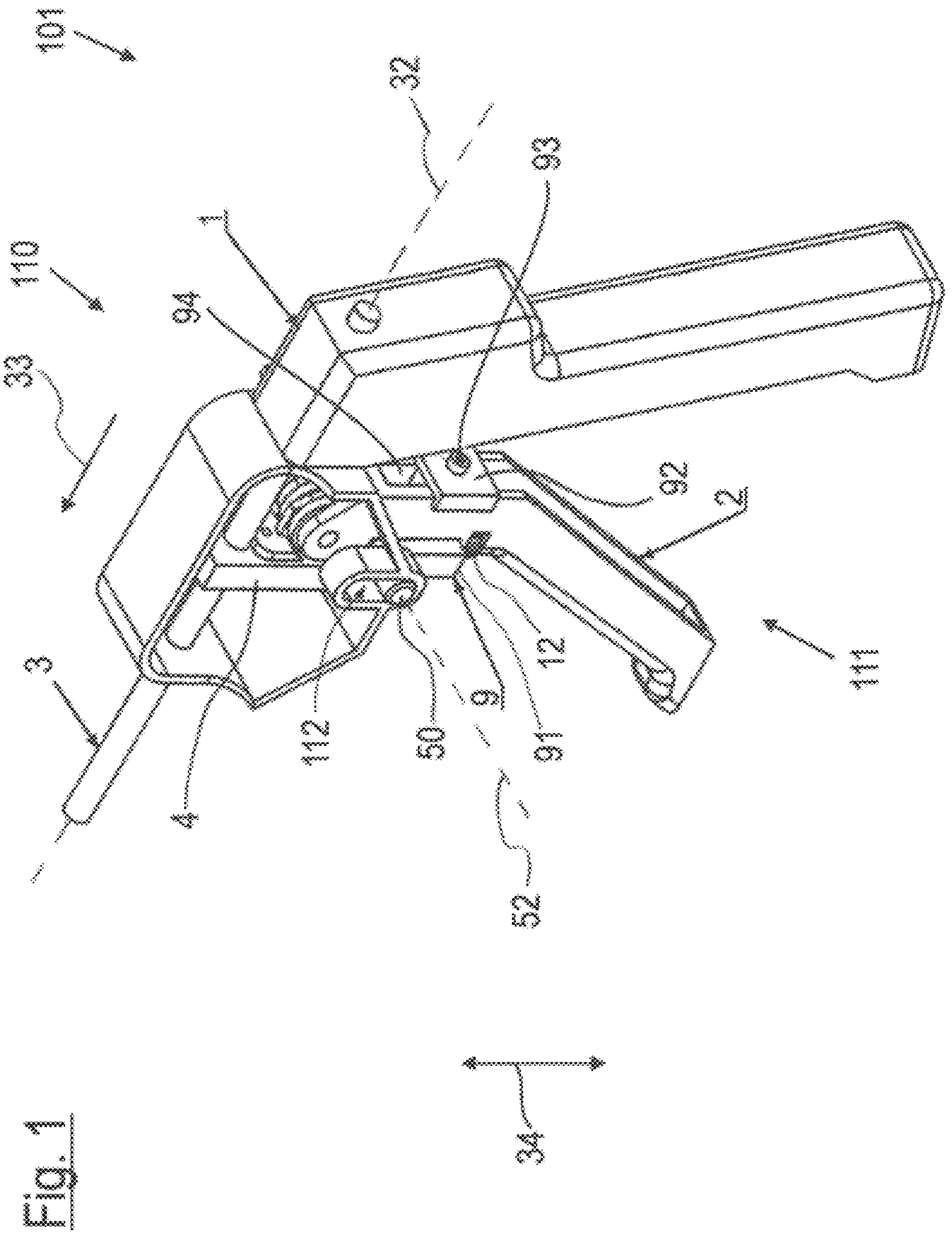
FIG. 1 illustrates a perspective view of a first dispenser.
Figure 2:
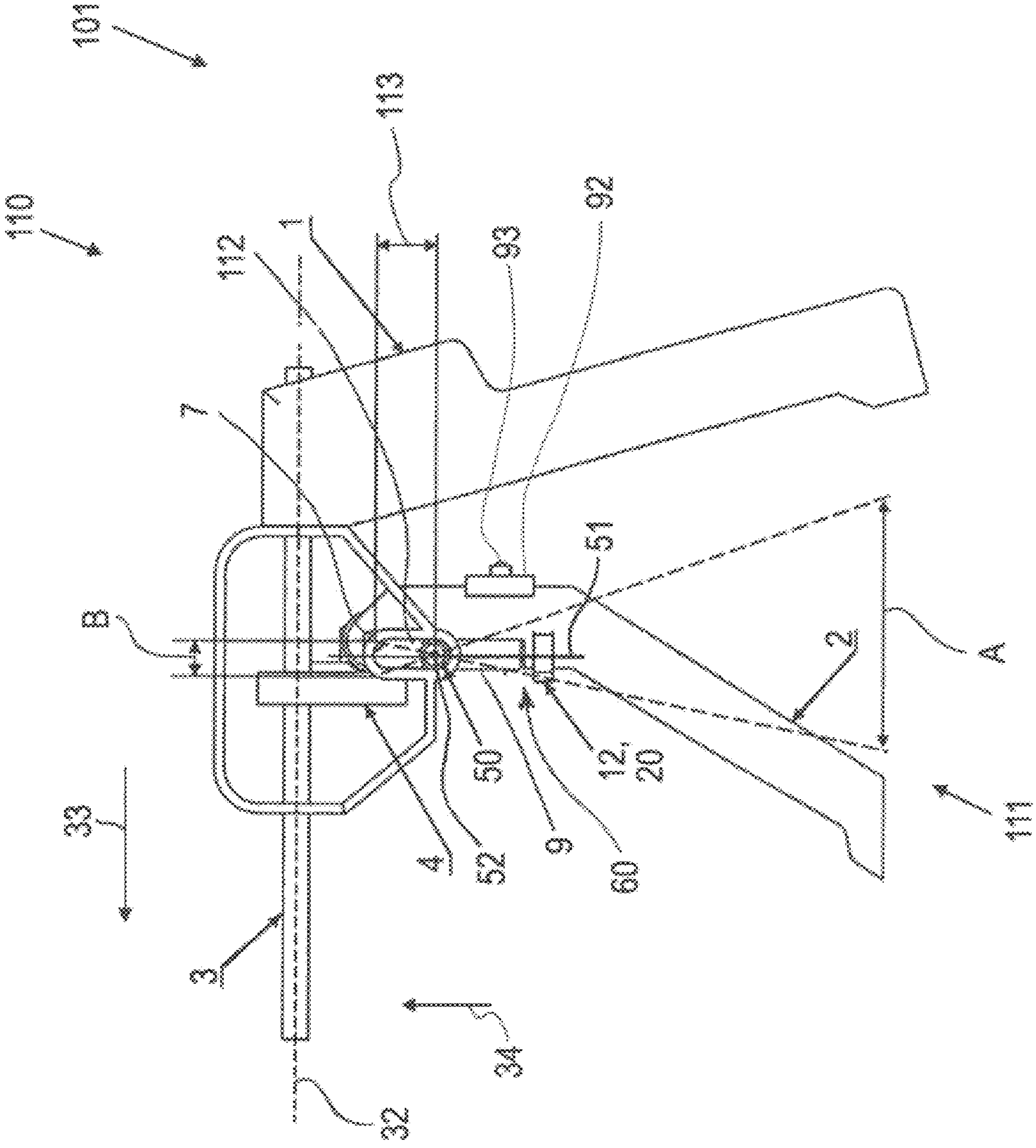
FIG. 2 illustrates a side view of the first dispenser.
Figure 3:
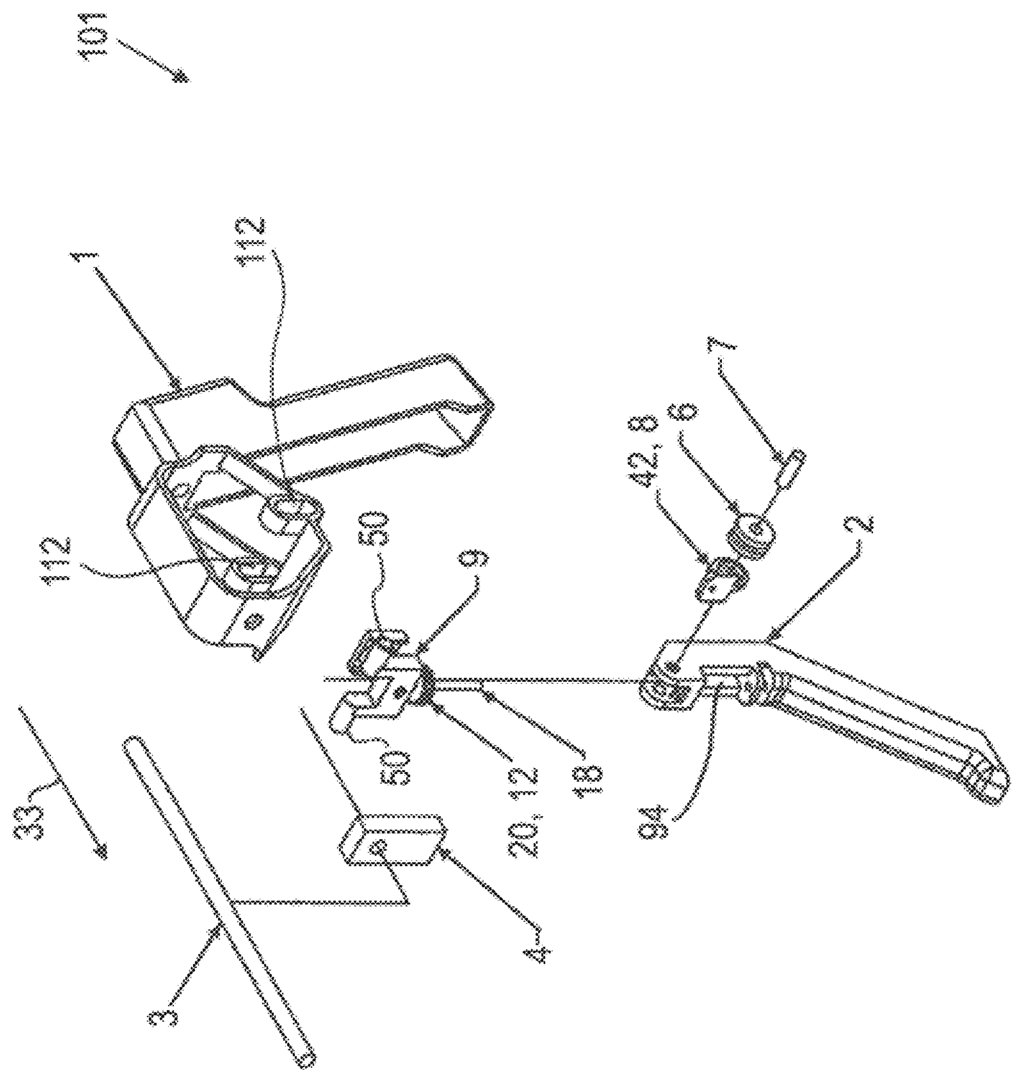
FIG. 3 illustrates an exploded view of the first dispenser.

FIGS. 1 to 3 depict a first dispenser 101 according to the present disclosure. The first dispenser 101 has a dispenser body 1 and a driving rod 3 that is slideably received within the dispenser body 1. Upon activation of a trigger lever 2 of the first dispenser 101, the driving rod 3 is advanced in a distal direction 33 along a longitudinal axis 32 into a receptacle, which is not shown in FIGS. 1 to 3. The receptacle is configured to receive a container that holds a material to be dispensed by the first dispenser 101. Upon movement in the distal direction 33, the driving rod 3 pushes against a plunger provided in the container and thereby urges the material out of a distal dispensing end of the container.

The trigger lever 2 is placed at a bottom side 111 of the first dispenser 101, whereby the bottom side 111 is located opposite to a top site 110 of the first dispenser 101 along the perpendicular axis 34. The trigger lever 2 is pivotally connected to the dispenser body 1 via two pivot members 50. The pivot members 50 are axially aligned and each have a cylindrical shape with the axes of the cylinders defining a rotation axis 52 of the trigger lever 2. Thereby, the rotation axis 52 is orientated perpendicular to the longitudinal axis 32. A perpendicular axis 34 is orientated perpendicular to the longitudinal axis 32 and the rotation axis 52 and the trigger lever 2 moves during actuation within a plane that is spanned by the longitudinal axis 32 and the perpendicular axis 34. Each pivot member 50 is received in an elongated recess 112 of the dispenser body 1, whereby the elongated recesses 112 run along the perpendicular axis 34.

The pivot members 50 extend parallel to the rotation axis 52 from two opposing lateral sides of a pivot assembly 9. The pivot assembly 9 is slideably connected to the trigger lever 2 and can move along a longitudinal direction of the trigger lever 2, whereby the longitudinal direction is orientated parallel to the perpendicular axis 34 when the trigger lever 2 is positioned in its unactuated rest position.

The pivot assembly 9 has a holding element, configured as a holding plate 91, that is integrally formed with the pivot members 50 and that is held on the trigger lever 2 via a fastening element 93 that extends through a longitudinal opening 94 of the trigger lever 2 and is countered by a plate-like counter piece 92 at an opposing side of the trigger lever 2.

A longitudinal position of the pivot members 50 can be defined and adjusted by an adjustment mechanism 60 that is configured to move the pivot assembly 9 along the trigger lever 2 via a control mechanism having a rotatable control member 20 and a threaded rod 18. The control member 20 is configured as a control thumb wheel 12. The control thumb wheel 12 is longitudinally fixed with respect to the trigger lever 2 and engages with the threaded rod 18 that is rotationally fixed to the pivot assembly 9 and extends from the holding element 91 along the longitudinal direction of the trigger lever 2. Upon rotation of the thumb wheel 12, the threaded rod 18 and thus also the pivot assembly 9 move longitudinally with respect to the thumb wheel 12 and the trigger lever 2.

The trigger lever 2 has an actuation member 7, which is configured as an actuation pin extending parallel to the rotation axis 52. Upon pressing the trigger lever 2 and rotation of the trigger lever 2 around the rotation axis 52, the actuation member 7 drives the driving rod 3 along the longitudinal axis 32 in the distal direction 33 by pushing against a clamping member 4 that is mounted to the driving rod 3 and configured as a catch plate 4.

The clamping member 4 receives the driving rod 3 within an opening. When being pushed by the actuation member 7 of the trigger lever 2 the clamping member 4 tilts around a tilting axis that is parallel to the rotation axis 52, thereby clamps with the driving rod 3 and moves the driving rod 3 in the distal direction 33.

The trigger lever 2 is fixed with respect to the longitudinal rod 3 along the perpendicular axis 34 via the clamping member 4, a connection member 42 and the actuation member 7. With the first dispenser 101, the connection member 42 is fixedly attached to the clamping member 4. Furthermore, the connection member 42 is configured as a roller holder 8 that holds a roller 6 next to the clamping member 4. The roller 6 receives the actuation member 7 in an axial through hole parallel to the rotation axis 52 so that the actuation member 7 pushes on the clamping member 4 via the roller 6. Upon movement of the clamping member 4, the roller 6 then rolls along the surface of the clamping member 4 thus reducing wear.

As can be seen from FIG. 2, a lever distance 113 between the rotation axis 52 defined by the pivot members 50 and the actuation member 7 can be changed by moving the pivot assembly 9 and the pivot members 50 with respect to the trigger lever 2 along the perpendicular axis 34. Due to movement of the trigger lever 2 along the perpendicular axis 34 being limited by the connection to the driving rod 3 via the connection member 42 and the clamping member 4, movement of the pivot assembly 9 along the trigger lever 2 causes the pivot members 52 move along the recesses 112 in the dispenser body 1.

Changing the lever distance 113 also changes the mechanical advantage A:B of the movement of the driving rod 3 by the trigger lever 2. This mechanical advantage A:B is defined by the ratio of a distance A traveled by a far end of the trigger lever 2 farthest away from the driving rod 3 to a distance B traveled by the actuation member 7 upon rotation of the trigger lever 2. The far end of the trigger lever 2 is thereby the longitudinal end of the trigger lever 2 opposite to the end holding the actuation member 7.

With the first dispenser 101, the lever distance 113 can be continuously fixed to any distance between a maximum lever distance, which is given by the pivot members 50 being positioned at the ends of the recesses 112 that are farthest away from the driving rod 3, and a minimum lever distance, which is given by the pivot members 50 being positioned at the ends of the recesses 112 that are nearest to the driving rod 3.

Figure 4:
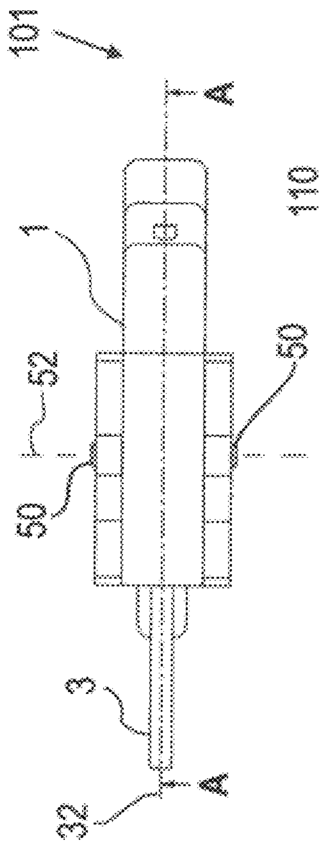
FIG. 4 illustrates a top view of the first dispenser.
Figure 5:
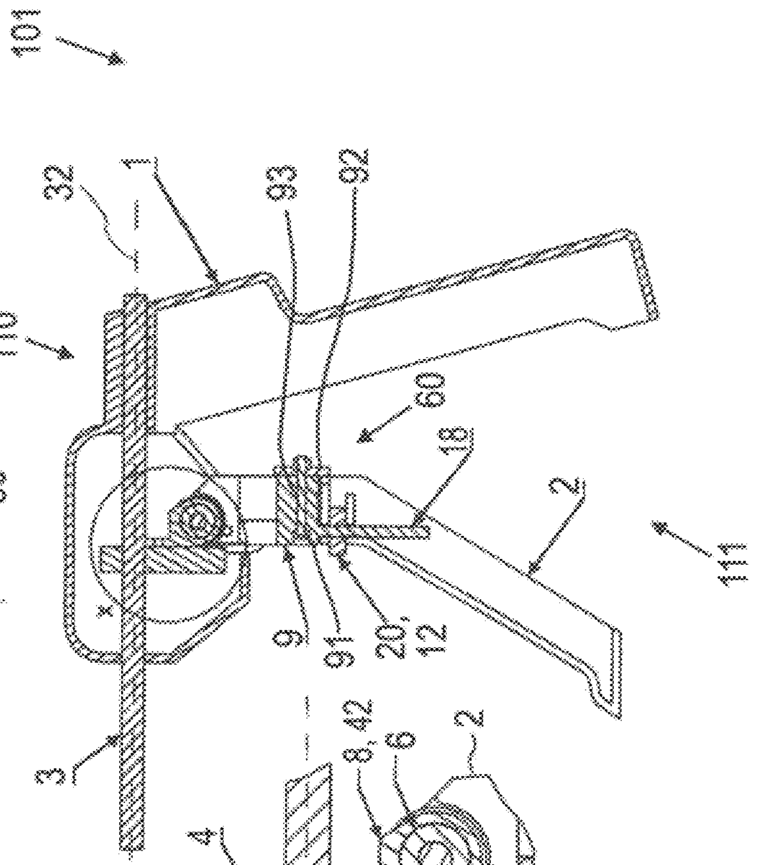
FIG. 5 illustrates a side view of a cut of the first dispenser in a cut plane along line A-A in FIG. 4.

FIG. 4 depicts a top view of the first dispenser 101 in a viewing direction perpendicular to the longitudinal axis 32 and the rotation axis 52. FIG. 5 depicts a cross-sectional side view of the first dispenser 101 in a central cross-sectional plane through the line A-A in FIG. 4 and through the perpendicular axis 34. This cross-sectional plane also cuts the axes of the threaded rod 18 and the fastening element 93 of the adjustment mechanism 60.

Figure 6:
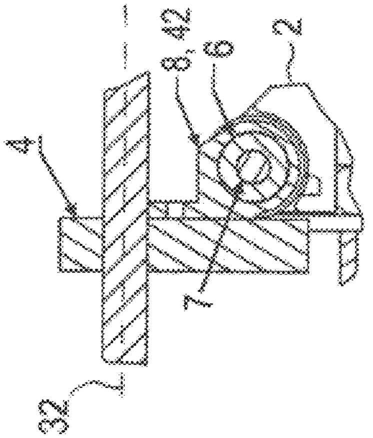
FIG. 6 illustrates a detailed view of the cut shown in FIG. 5.

FIG. 6 is a detailed view of the cross-sectional view in FIG. 5. As can be seen from FIG. 6, the roller 6 is axially aligned with the actuation member 7 and both the actuation member 7 and the roller 6 are held in a central bore or seat of the roller holder 8.

Figure 7:
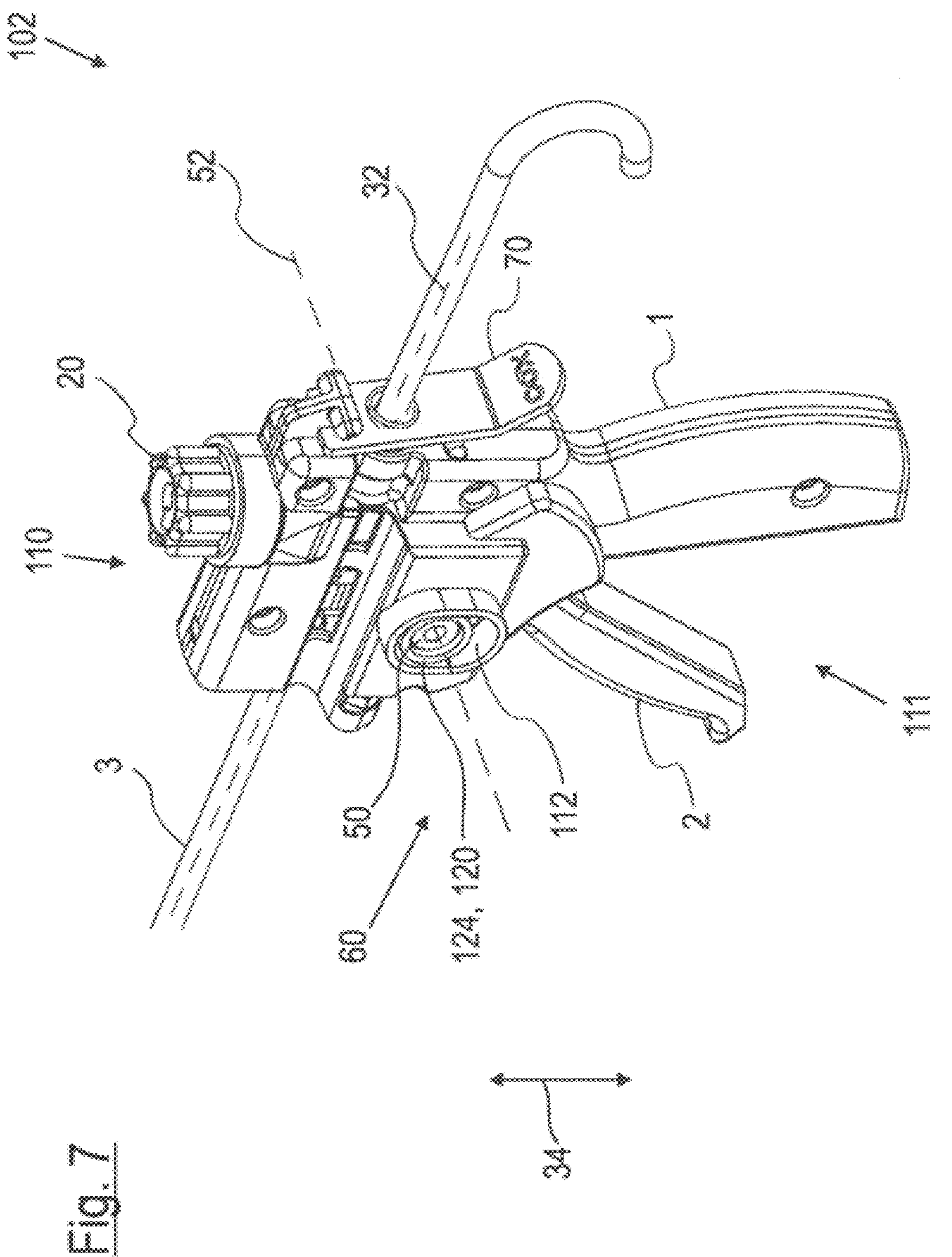
FIG. 7 illustrates a perspective view of a second dispenser.
Figure 8:
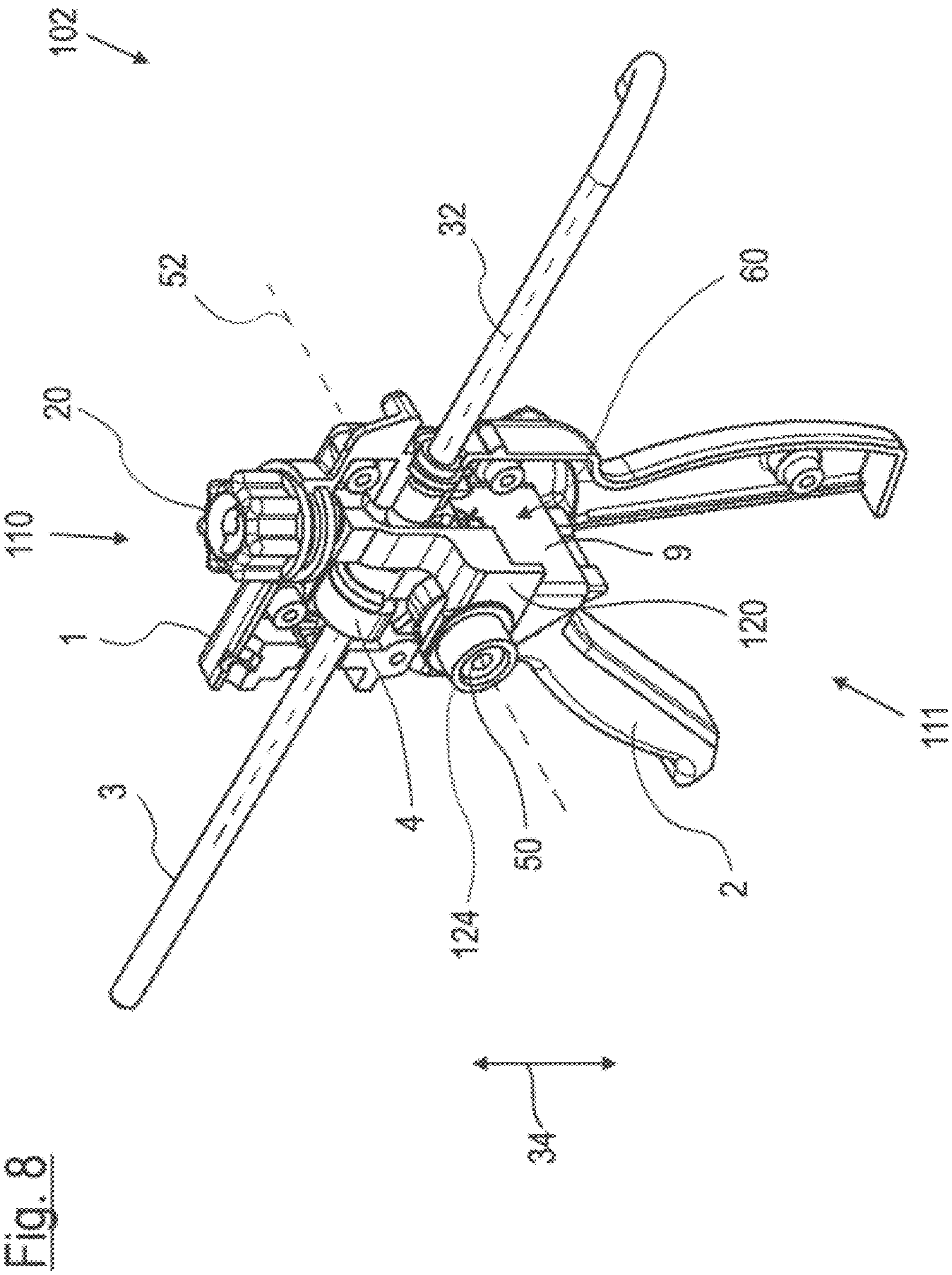
FIG. 8 illustrates a perspective partial view of the second dispenser with one half of a dispenser body and a brake plate of the second dispenser omitted.
Figure 9:
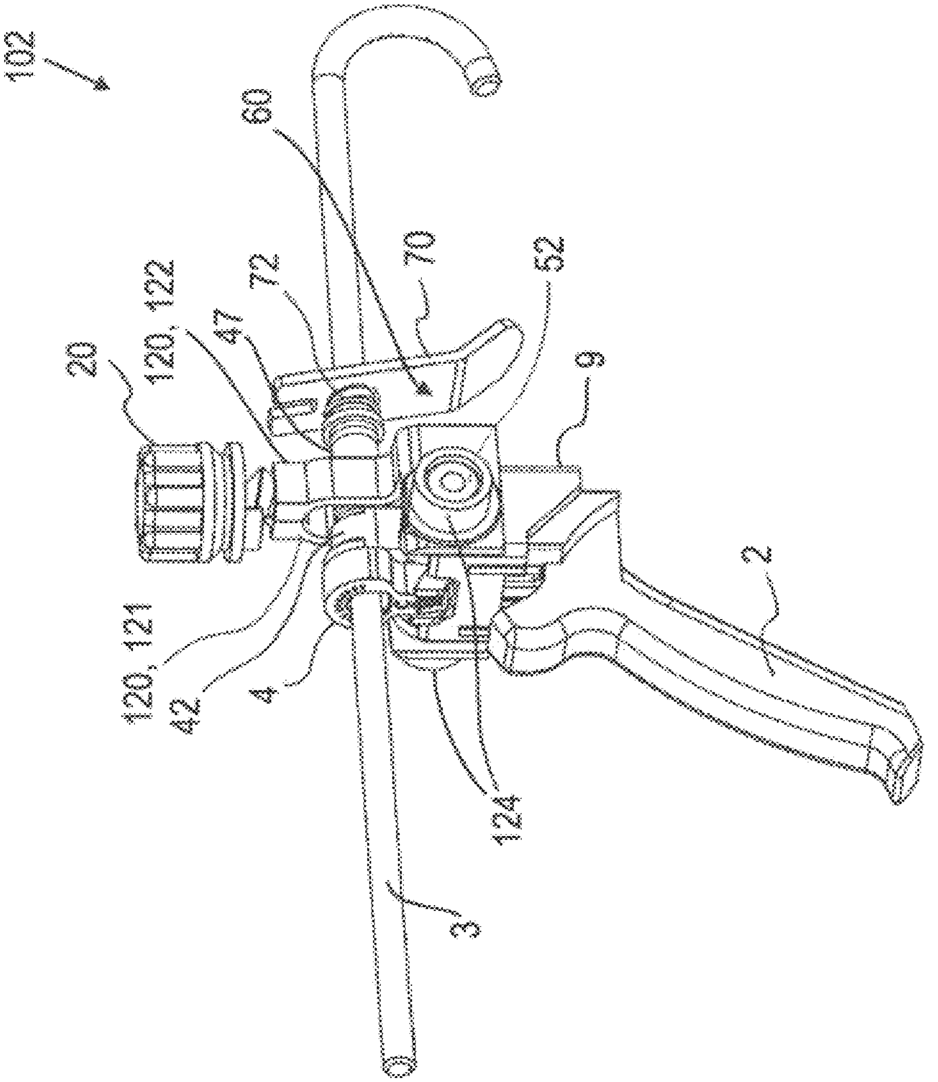
FIG. 9 illustrates a further perspective partial view of the second dispenser with the entire dispenser body omitted.
Figure 10:
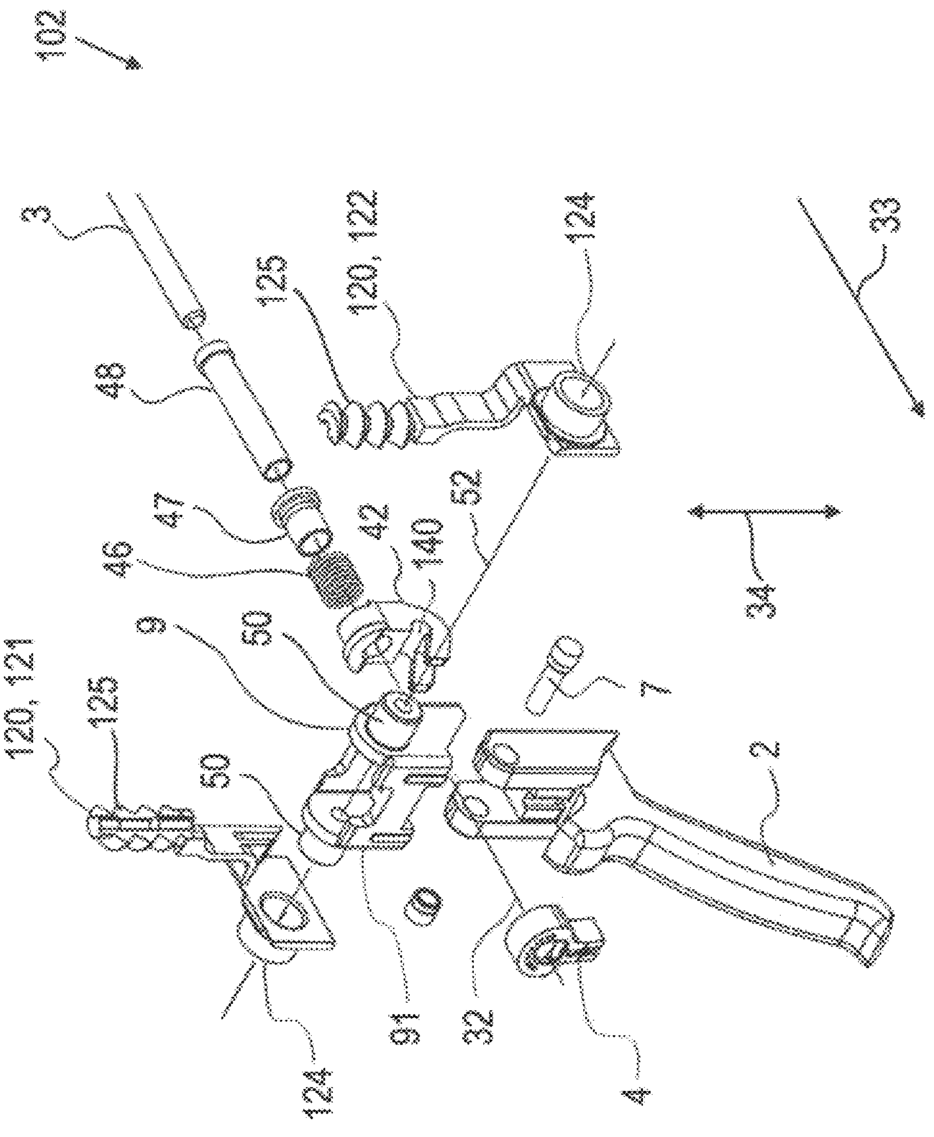
FIG. 10 illustrates an exploded partial view of the second dispenser.

FIG. 7 shows a perspective view of a second dispenser 102 according to the present disclosure. FIG. 8 shows a perspective partial view of the second dispenser 102 with one half of a dispenser body 1 and a brake plate 70 of the second dispenser 102 omitted. FIG. 9 shows a further perspective partial view of the second dispenser 102 with the entire dispenser body 1 omitted and FIG. 10 shows an exploded partial view of the second dispenser 102. As far as no differences are described or apparent from the Figures, the second dispenser 102 is configured as it is disclosed for the first dispenser 101.

While the adjustment mechanism 60 of the first dispenser 101 fixes the position of the pivot assembly 9 relative to the trigger lever 2 and the pivot assembly 9 is movable with respect to the dispenser body 1 during operation of the first dispenser 101, the adjustment mechanism 60 of the second dispenser 102 fixes the position of the pivot assembly 9 relative to the dispenser body 1 during operation and the pivot assembly 9 can move with respect to the trigger lever 2.

The pivot assembly 9 of the second dispenser 102 has a holding element 91 that is integrally formed with the pivot members 50 of the second dispenser 102. The holding element 91 is configured as a carriage that slideably receives an upper part of the trigger lever 2 in a central opening.

The pivot members 50 of the pivot assembly 9 are received in longitudinal recesses 112 of the dispenser body 1. Thereby, the pivot members 50 are surrounded by supports of a restraining member 120 of the adjustment mechanism 60, the supports being configured as lateral sleeves 124. The lateral sleeves 124 are positioned between the pivot members 50 and the sidewalls of the longitudinal recess 112 of the dispenser body 1. Therefore, a position of the pivot members 50 along the perpendicular axis 34 is defined by the position of the lateral sleeves 124 of the restraining member 120.

The restraining member 120 is maintained in the dispenser body 1 in a slidable position along the perpendicular axis 34. The position of the restraining member 120 and thus also the position of the lateral sleeves 124 is controlled by a control mechanism having a rotatable control member 20 that is placed at the top side 110 of the dispenser body 1 opposing its bottom side 111 at which the trigger lever 2 is attached. The control member 20 is configured as a rotatable knob. It engages with a threaded rod 125 of the control mechanism that is connected to the restraining member 120 and that extends along the perpendicular axis 34, whereby rotation of the control element 20 displaces the threaded rod 125 and the restraining member 120 along the perpendicular axis 34. The threaded rod 125 is integrally formed with the restraining member 120.

As can be seen from FIG. 10, the restraining member 120 comprises a first part 121 and a second part 122, each of the parts 121, 122 forming one half of the restraining member 120 with respect to a cut plane spanned by the longitudinal axis 32 and the perpendicular axis 34. Thereby, each part 121, 122 is integrally formed with one half of the threaded rod 125. This construction allows the restraining member 12 to be mounted around the pivot assembly 9 by joining the parts 121, 122 together from two opposing sides of the threaded rod 3 along the rotation axis 52.

Figure 11:
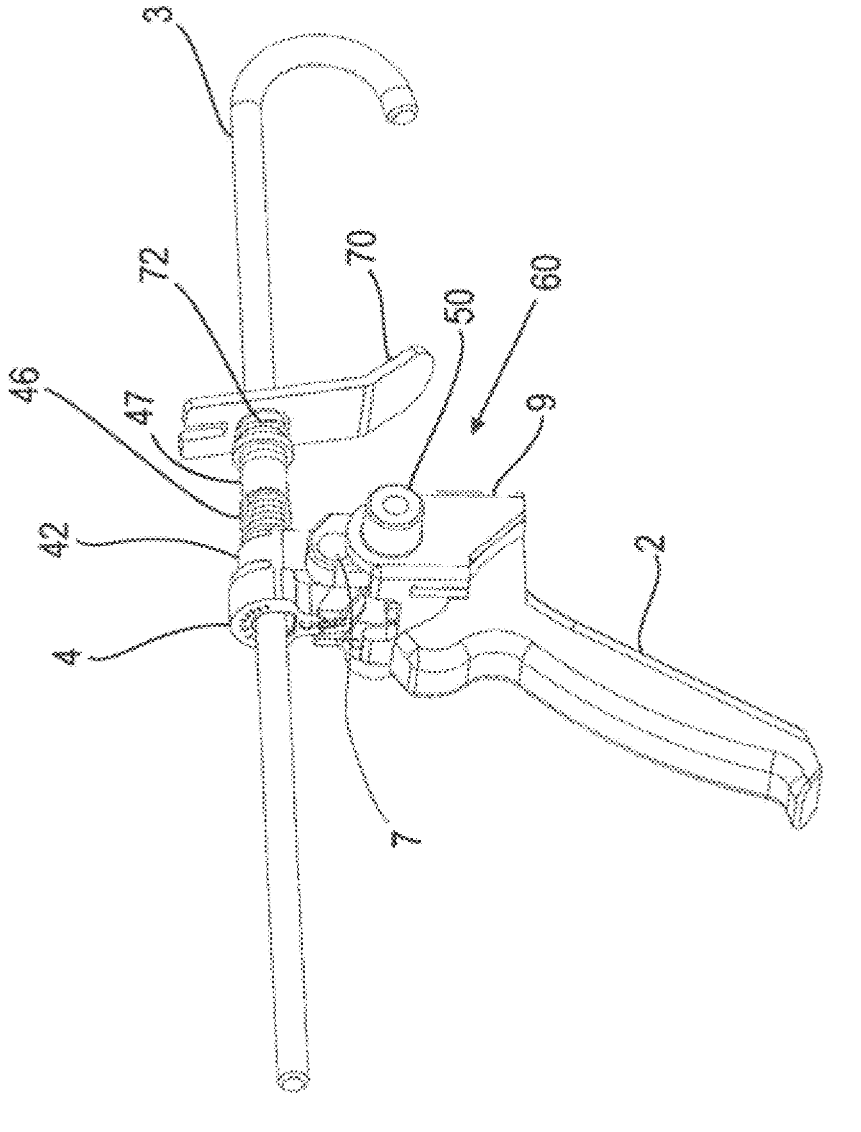
FIG. 11 illustrates the perspective partial view of the second dispenser from FIG. 9 with a control member and a restraining member omitted.
Figure 12:
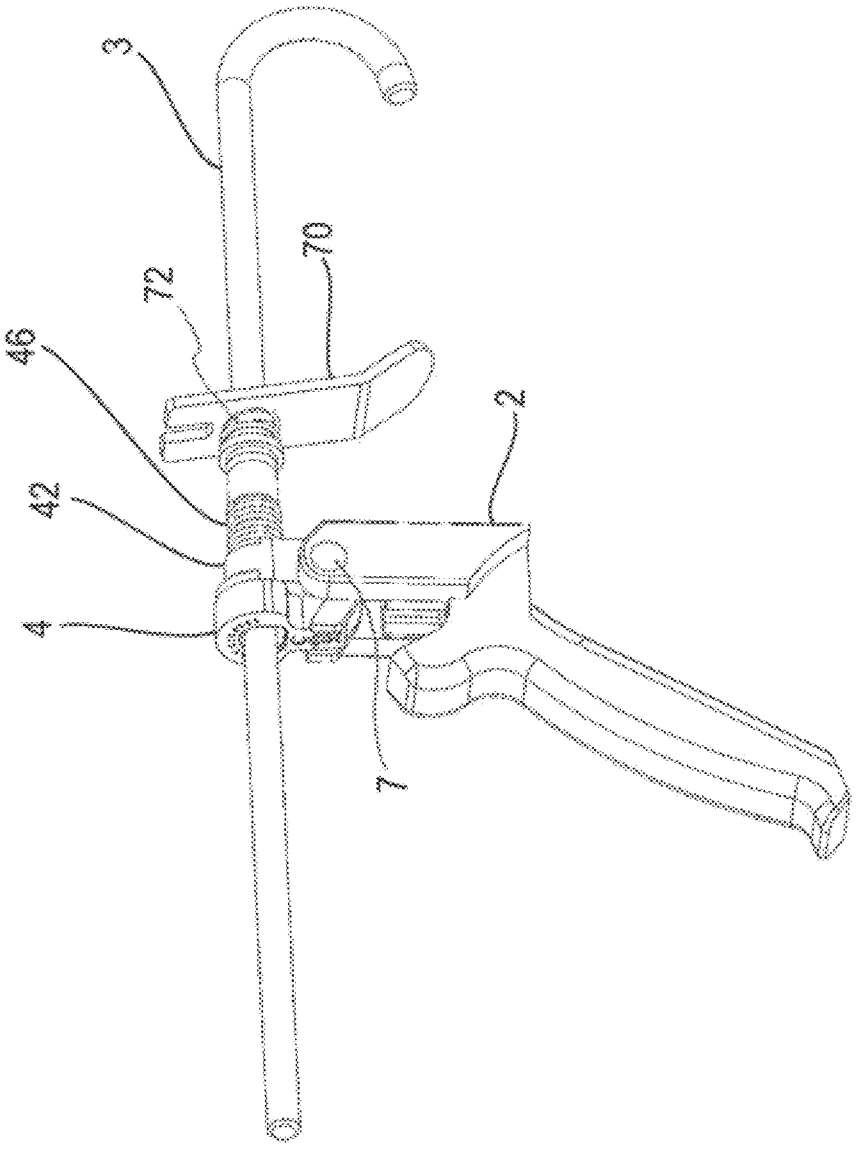
FIG. 12 illustrates the perspective partial view of the second dispenser from FIG. 11 with a pivot assembly omitted.

FIG. 11 shows the perspective partial view of the second dispenser 102 from FIG. 9 with the control member 20 and the restraining member 120 omitted. Different than in FIG. 9, the pivot assembly 9 is depicted in FIG. 11 in its position farthest away from the longitudinal rod 3, which results in the maximum distance between the pivot members 50 and the actuation member 7. FIG. 12 shows the perspective partial view of the second dispenser 102 from FIG. 11 with also the pivot assembly 9 omitted.

As can be seen from FIGS. 10, 11 and 12, the trigger lever 2 of the second dispenser 102 is connected to the driving rod 3 via a connection member 42 that is located behind the clamping member 4 along the distal direction 33 and that rests against the clamping member 4. The connection member 42 is thereby pushed against the clamping member 4 by a biasing element 46, which is configured as a compression spring. The biasing element 46 rests with one end against the connection member 42 and with its other end against a proximal inner surface of the dispenser body 1.

The connection member 42 receives the driving rod 3 in a longitudinal rod opening that is orientated parallel to the longitudinal axis 32. Thereby, both the connection member 42 and the biasing element 46 are supported by a support element 48 that is placed between the driving rod 3 and the connection member 42 and the biasing element 46, respectively. The support element 48 is configured as a hollow sleeve. The support element 48 also extends through the dispenser body 1, whereby an outer sleeve 47 is placed between the support element 48 and the dispenser body 1.

The brake plate 70 of the second dispenser 102 is positioned at the proximal rear end of the dispenser body 1 and surrounds the driving rod 3. It clamps against the driving rod 3 when the driving rod 3 is urged in a proximal direction, which is opposite to the distal direction 33. Thus, the break plate 70 prevents the driving rod 3 from being moved out of the receptacle. The brake plate 70 is biased by a break biasing element 72, which is configured as a compression spring surrounding the driving rod 3 and which rests with one end against the break plate 70 and with its other end against the dispenser body 1.

Figure 13:
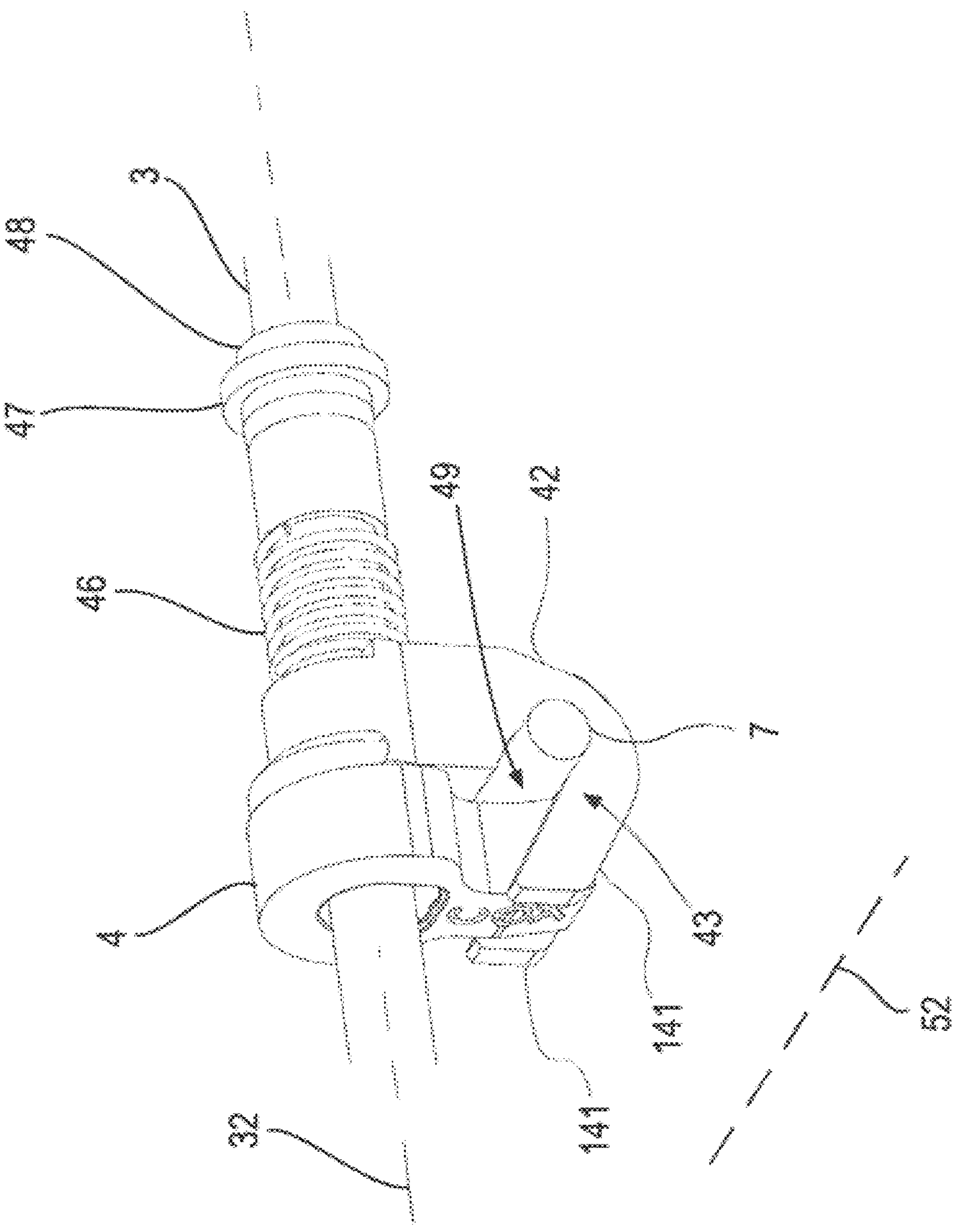
FIG. 13 illustrates a perspective view of a connection member mounted to a driving rod of the second dispenser.

FIG. 13 depicts the connection member 42 mounted on the driving rod 3 together with the actuation member 7 of the trigger lever 2 and the clamping member 4. The connection member 42 receives the actuation member 7 of the trigger lever 2 in an angled seat 43 that has an angle with both the longitudinal axis 32 and the rotation axis 52. The connection member 42 further comprises two forks 141 that extend from the seat 43 and surround the clamping element 4 in a contact region 49, in which the actuation member 7 rests against the clamping member 4.

Figure 14:
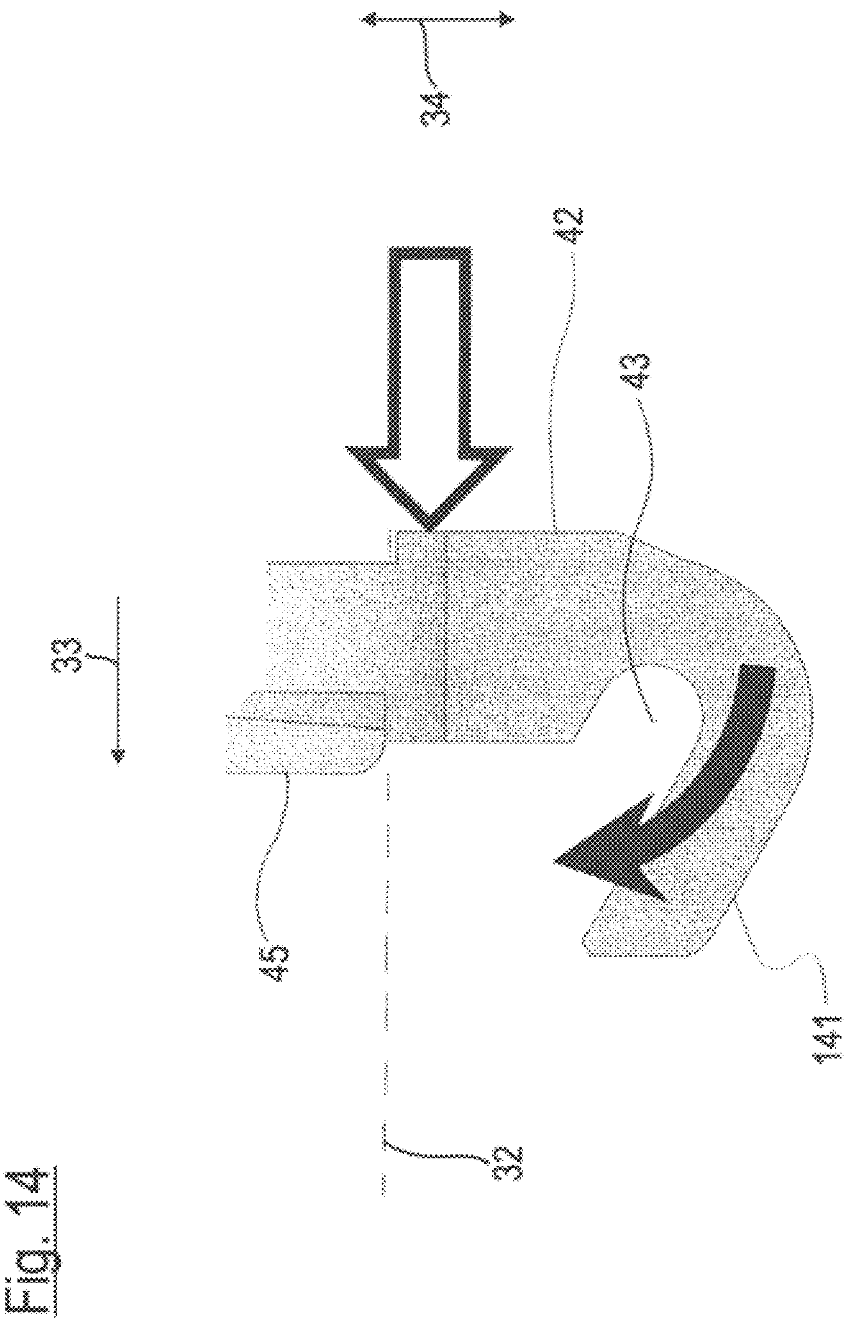
FIG. 14 illustrates a side view of the connection member.

As can be seen from FIG. 14, which shows the connection member 42 in a side view with a viewing direction parallel to the rotation axis 52, the connection member 43 contacts the clamping member 4 with a rest surface 45 that is positioned along the perpendicular axis 34 entirely above the longitudinal axis 32 of the driving rod 3. When being pushed by the biasing element 46 in the distal direction 33, which is indicated in FIG. 14 by a hollow arrow, the biasing element 46 rocks around a rocking axis that is parallel to the rotation axis 52 of the trigger lever 2. Due to this rocking movement, which is indicated in FIG. 14 by a solid arrow, the connection member 42 biases the trigger lever 2 towards the driving rod 3.

With other embodiments of the second dispenser 102, the connection member 42 can also be configured as a roller holder that surrounds a roller, which is mounted on the actuation member 7, analogously as it is described in connection with the first dispenser 101. This roller can rest against the clamping member 4 instead of the actuation member 7 to reduce wear.

Figure 15:
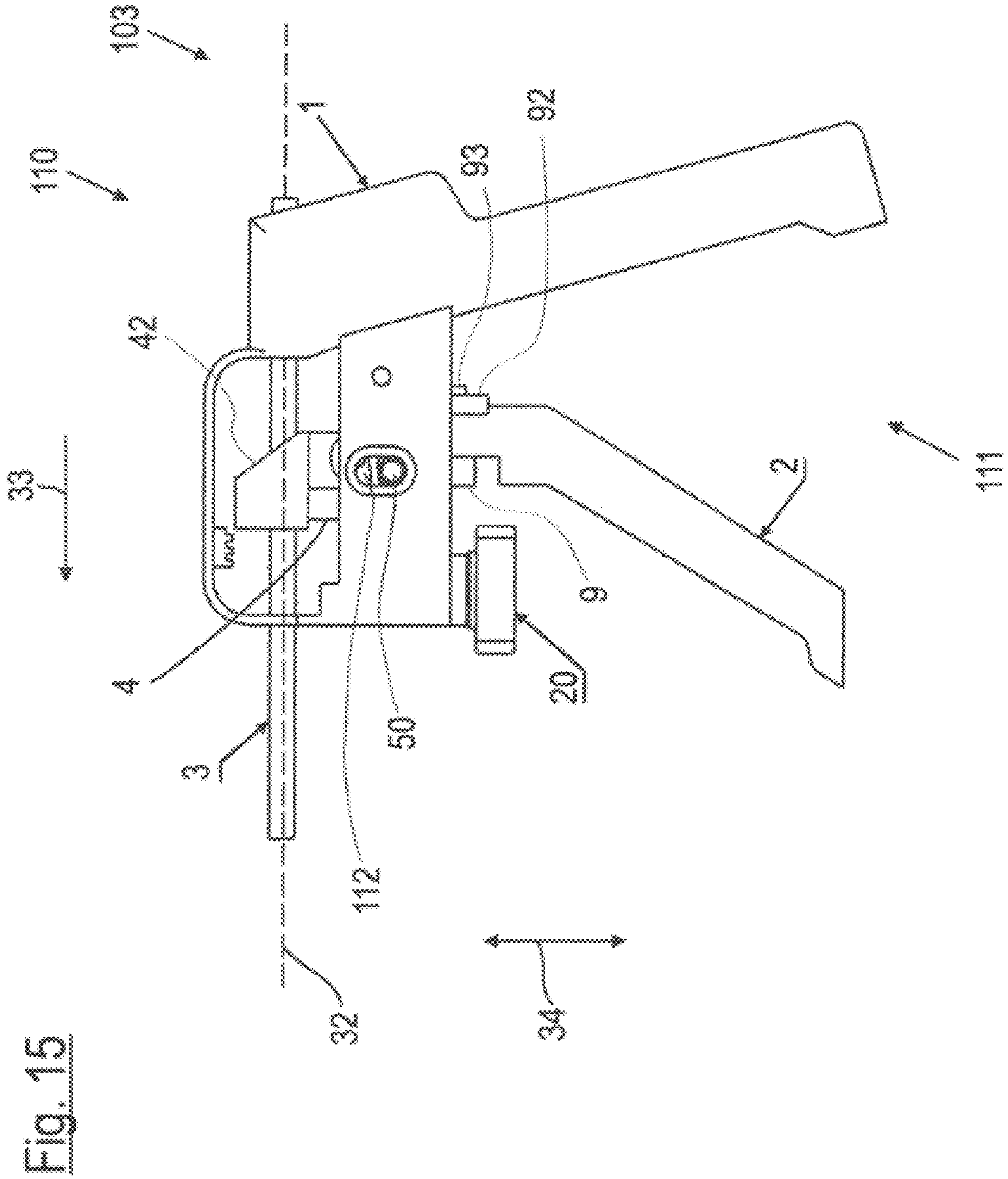
FIG. 15 illustrates a side view of a third dispenser.
Figure 16:
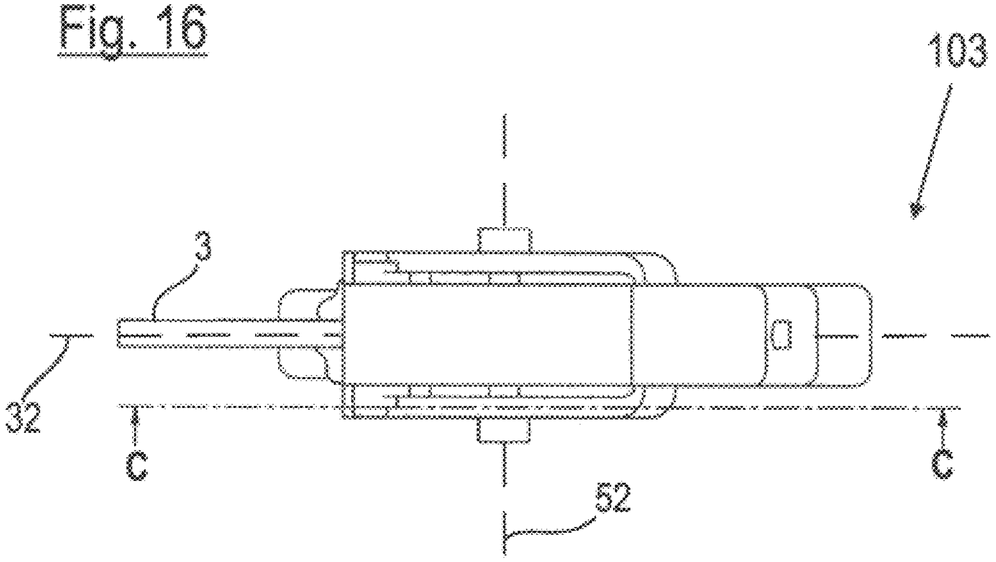
FIG. 16 illustrates a top view of the third dispenser.
Figure 17:
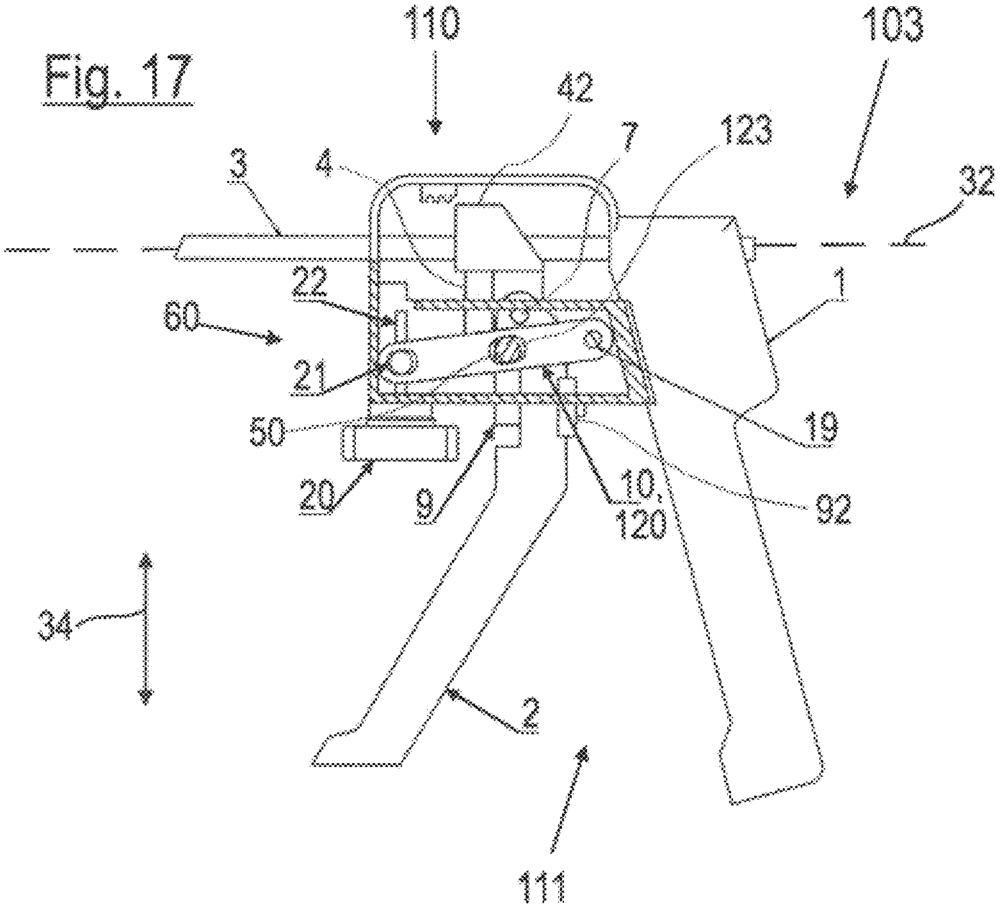
FIG. 17 illustrates a side view of a cut through the third dispenser in a cut plane parallel to the line C-C in FIG. 16.

FIG. 15 shows a side view of a third dispenser 103 according to the present disclosure. FIG. 16 shows a top view of the third dispenser 103 and FIG. 17 shows a side view of a cut through the third dispenser 103 in a plane through the section line C-C in FIG. 16. As far as no differences are described or apparent from the Figures, the third dispenser 103 is configured as it is disclosed in connection with the first dispenser 101.

Unlike the pivot assembly 9 of the first dispenser 101 and like the pivot assembly 9 of the second dispenser 102, the pivot assembly 9 of the third dispenser 103 moves with respect to the trigger lever 2 during operation of the trigger lever 2 while its position relative to the dispenser body 1 is fixed by restraining members 120. These restraining members 120 are configured as control plates 10 that have an elongated bar-like shape. At one end, the restraining members 120 are pivotally connected to the dispenser body 1 via a control plate pivot 19 so that they can rotate around the control plate pivot 19 in a plane perpendicular to the rotation axis 52.

A rotational position of the restraining members 120 is defined by a control mechanism with a control member 20, which is configured as a rotatable knob. The control member 20 is fixedly connected to a control threaded rod 22 of the control mechanism that engages with a tee nut 21 connected to the free end of the restraining member 120. Upon rotation of the control member 20 and the threaded rod 22, the nut 21 moves along the threaded rod 22 parallel to the perpendicular axis 34.

Each restraining member 120 has a longitudinal support 123 that is configured as a longitudinal slot and that receives one of the pivot members 50 of the pivot assembly 9. Simultaneously, the pivot members 50 are each guided in a longitudinal recess 112 at the dispenser body 1. Thereby, a position of a lateral overlapping area of the longitudinal support 123 of the restraining member 120 and the longitudinal recess 112 of the dispenser body 1 defines the position of the pivot member 50 in the perpendicular direction 34.

Like the first and second dispenser 101, 102, the third dispenser 103 has a connection member 42 that limits vertical movement of the trigger lever 2 with respect to the driving rod 3 along the perpendicular axis 34.

Figure 18:
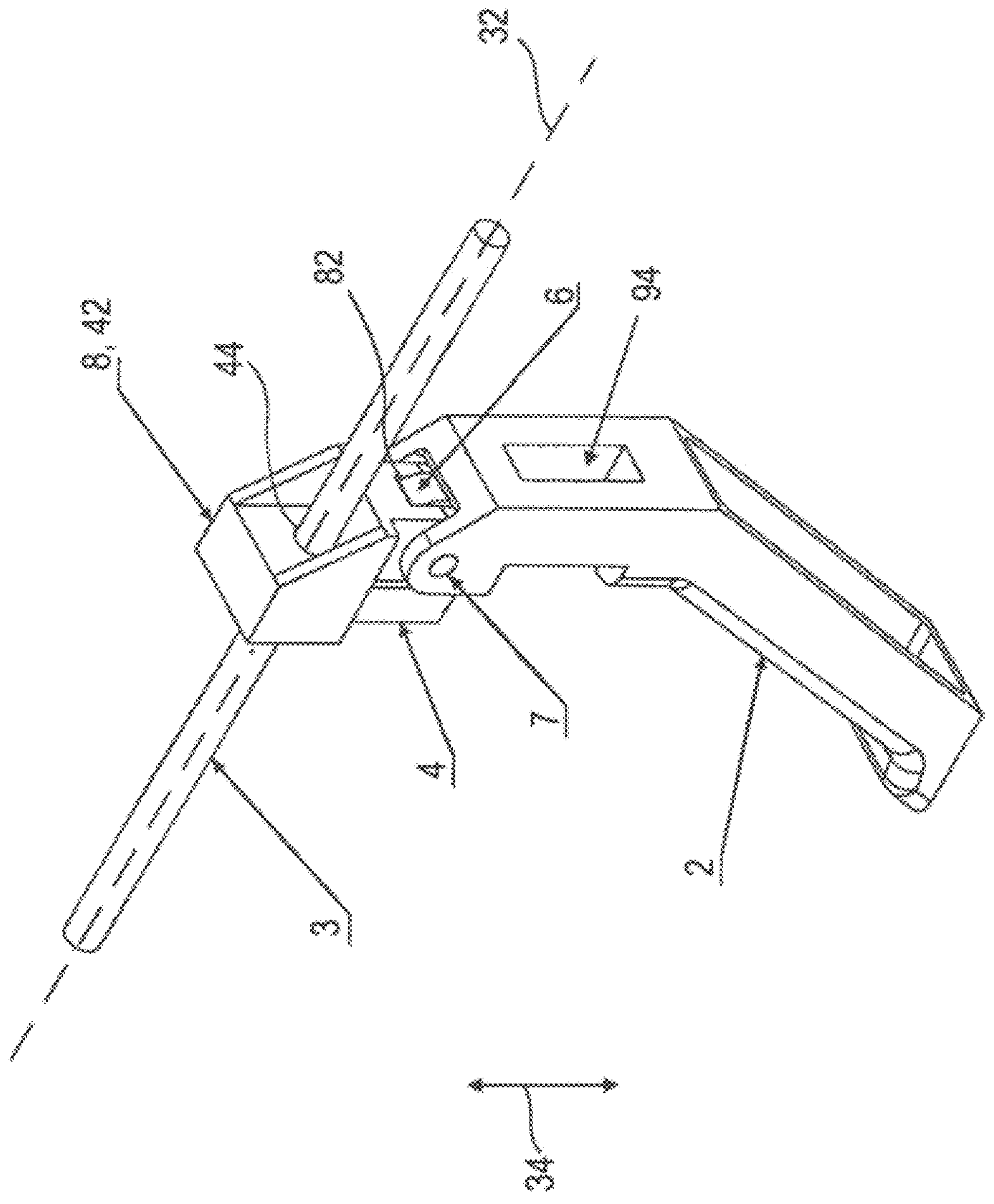
FIG. 18 illustrates a trigger lever of the third dispenser mounted to a driving rod of the third dispenser.

FIG. 18 shows the trigger lever 2 of the third dispenser 103 mounted to the driving rod 3 via the connection member 42. The connection member 42 is configured as a roller holder 8 that holds, like the connection member 42 of the first dispenser 101, a roller 6 at the clamping member 4. The connection member 42 receives the driving rod 3 in a rod opening 44 and rests against the clamping member 4.

Figure 19:
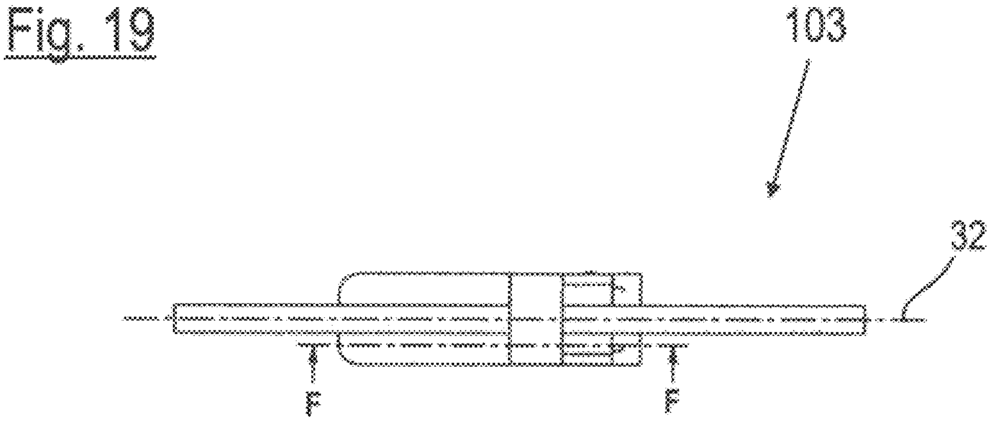
FIG. 19 illustrates a top view of the third dispenser.
Figure 20:
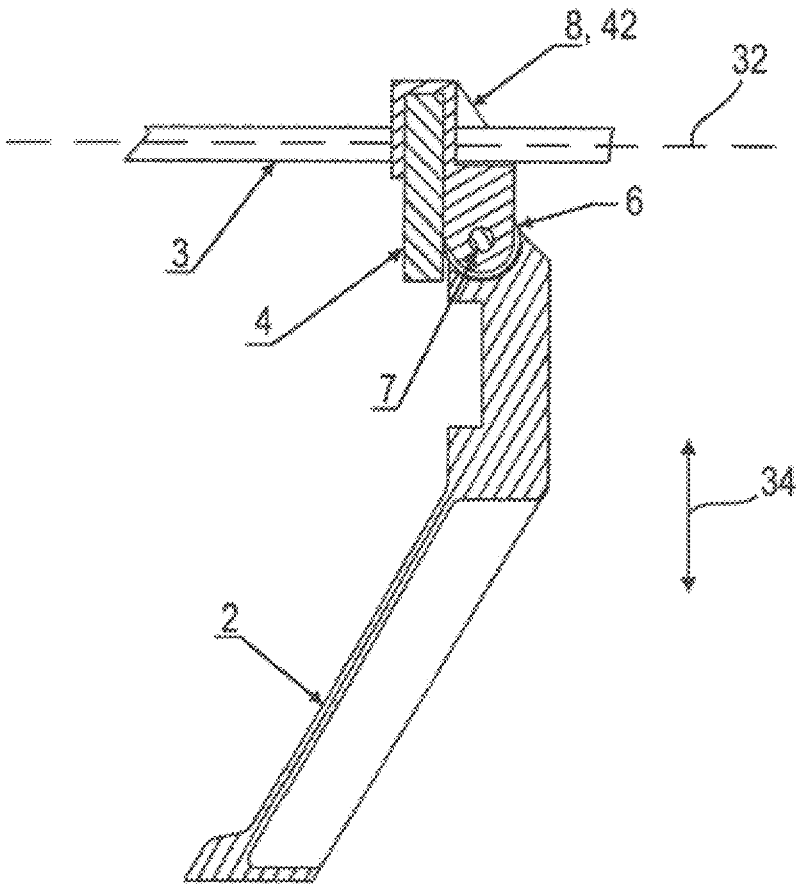
FIG. 20 illustrates a side view of a cut through the trigger lever, the connection member, the driving rod and the clamping member of the third dispenser.

FIG. 19 shows a top view of the third dispenser 103 and FIG. 20 shows a side view of a cut through the trigger lever 2, the connection member 42, the driving rod 3 and the clamping member 4 of the third dispenser 103 along the line F-F in FIG. 19. The connection member 42 partly surrounds the clamping member 4 and receives the actuation member 7 in a support that is configured as through holes within ridges surrounding the roller 6 on opposing sides with respect to the rotation axis 52.

Figure 22:
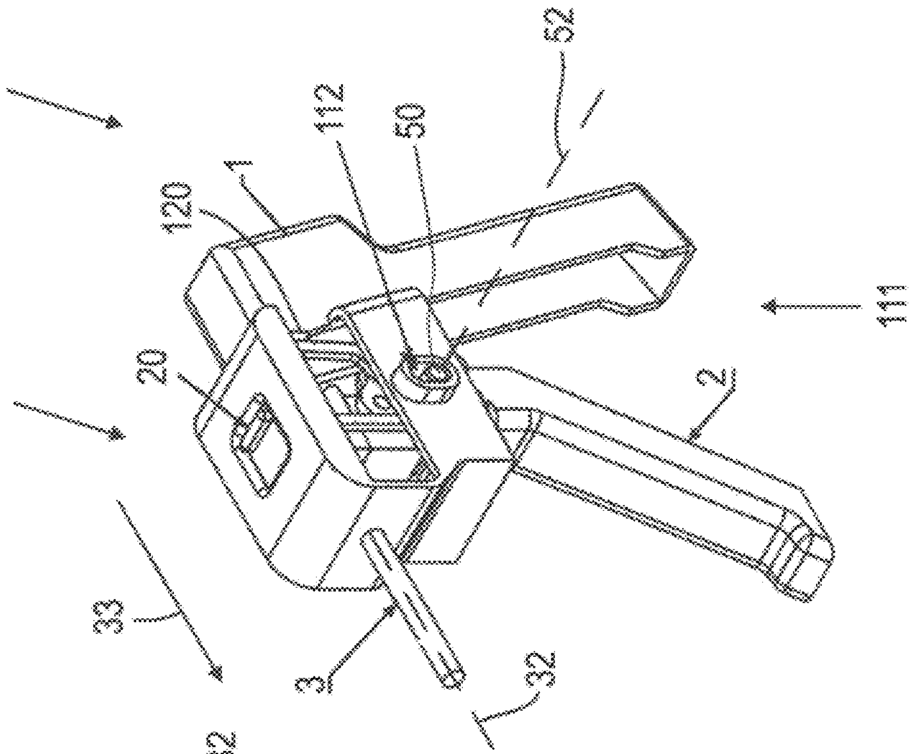
FIG. 22 illustrates a perspective view of the fourth dispenser.
Figure 21:
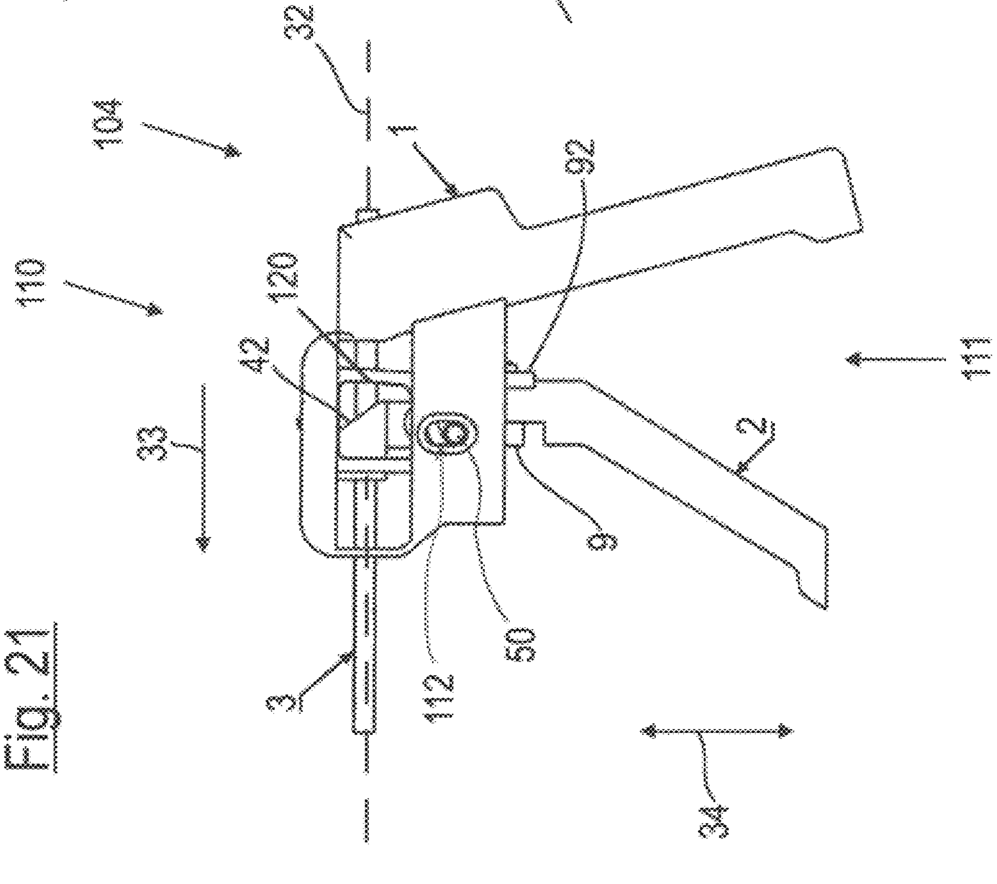
FIG. 21 illustrates a side view of a fourth dispenser according to the present disclosure.
Figure 23:
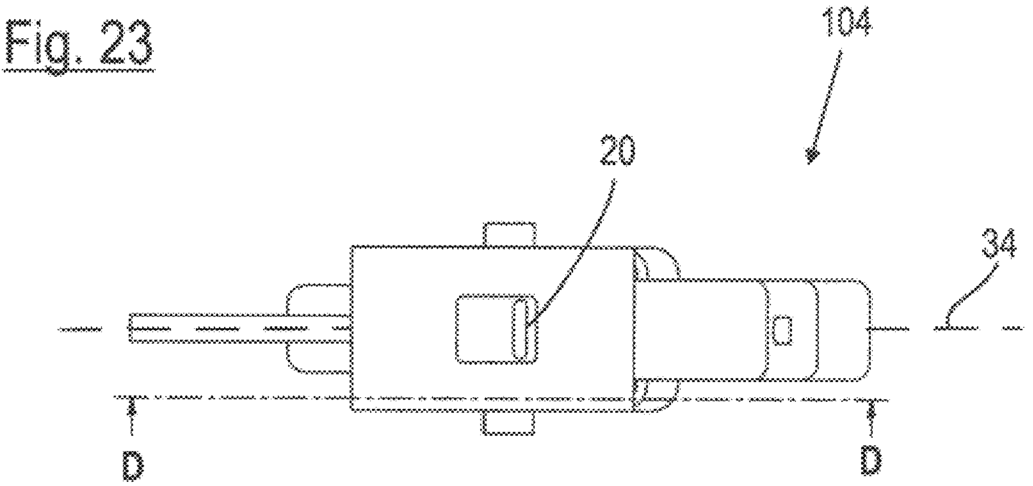
FIG. 23 illustrates a top view of the fourth dispenser.
Figure 24:
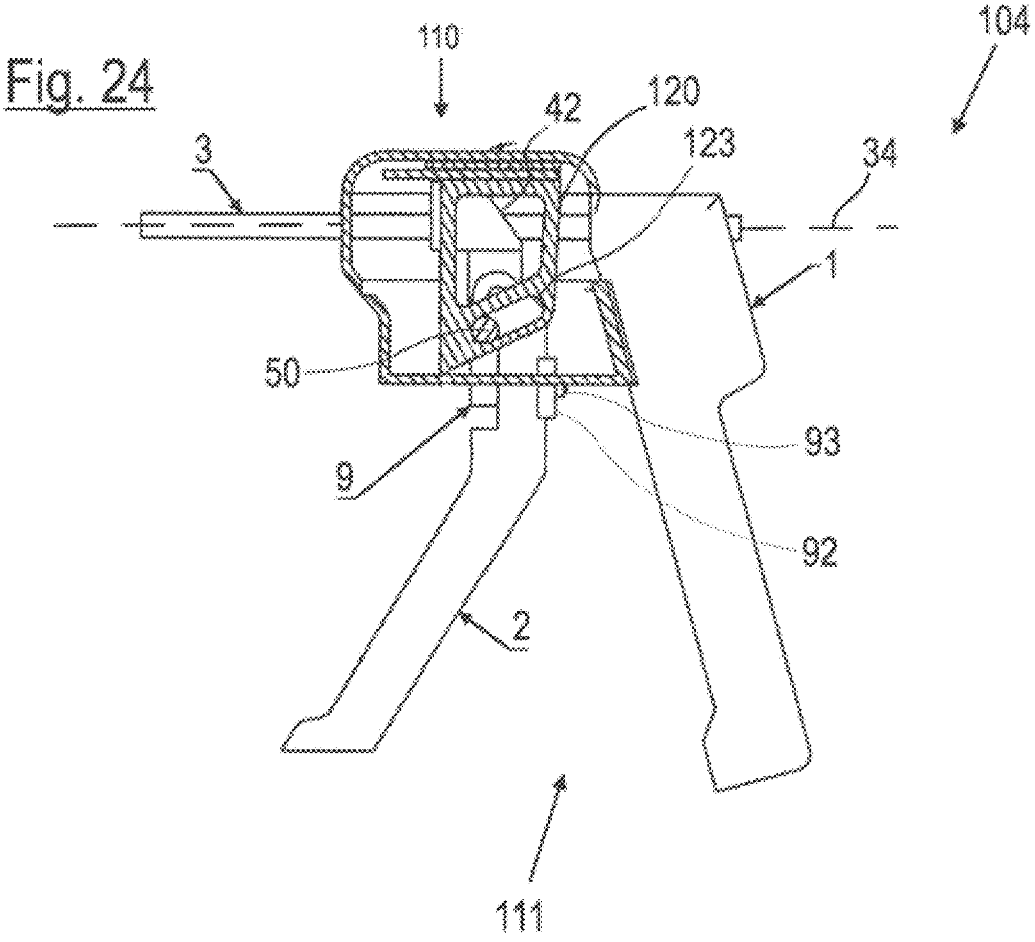
FIG. 24 illustrates a side view of a cut through the fourth dispenser.

FIG. 21 shows a side view of a fourth dispenser 104 according to the present disclosure. FIG. 22 shows a perspective view of the fourth dispenser 104, FIG. 23 shows a top view of the fourth dispenser 104 and FIG. 24 shows a side view of a cut through the fourth dispenser 104 in a cut-plane orientated along the line D-D shown in FIG. 23. As far as no differences are described or apparent from the Figures, the fourth dispenser is configured as it is disclosed for the third dispenser 103.

With the fourth dispenser 104, the pivot members 50 are received in longitudinal supports 123 of plate-like restraining members 120 that are movable along the longitudinal axis 34. The longitudinal supports 123 are configured as longitudinal cutouts within the restraining members 120. The elongated supports 123 of the restraining elements 120 have an angle with respect to the elongated recesses 112 of the dispenser body 1.

Each of the elongated supports 123 and its respective adjacent recess 112 receive one of the pivot members 50 of the fourth dispenser 104 and positions of overlapping areas between the elongated supports 123 and the elongated recesses 112 along the perpendicular axis 34 define the positions of the pivot members 50 along the perpendicular axis 34. A longitudinal position of the restraining members 120 and thus also the positions of the overlapping areas along the perpendicular axis 34 are controlled by a control element 20 that is placed at the top side 110 of the fourth dispenser 104 and that is configured as a slider movable parallel to the longitudinal axis 32. The control element 20 is fixedly connected to the restraining members 120 so that displacement of the control element 20 along the longitudinal axis 32 also shifts the restraining members 120 along the longitudinal axis 32.

Figure 25:
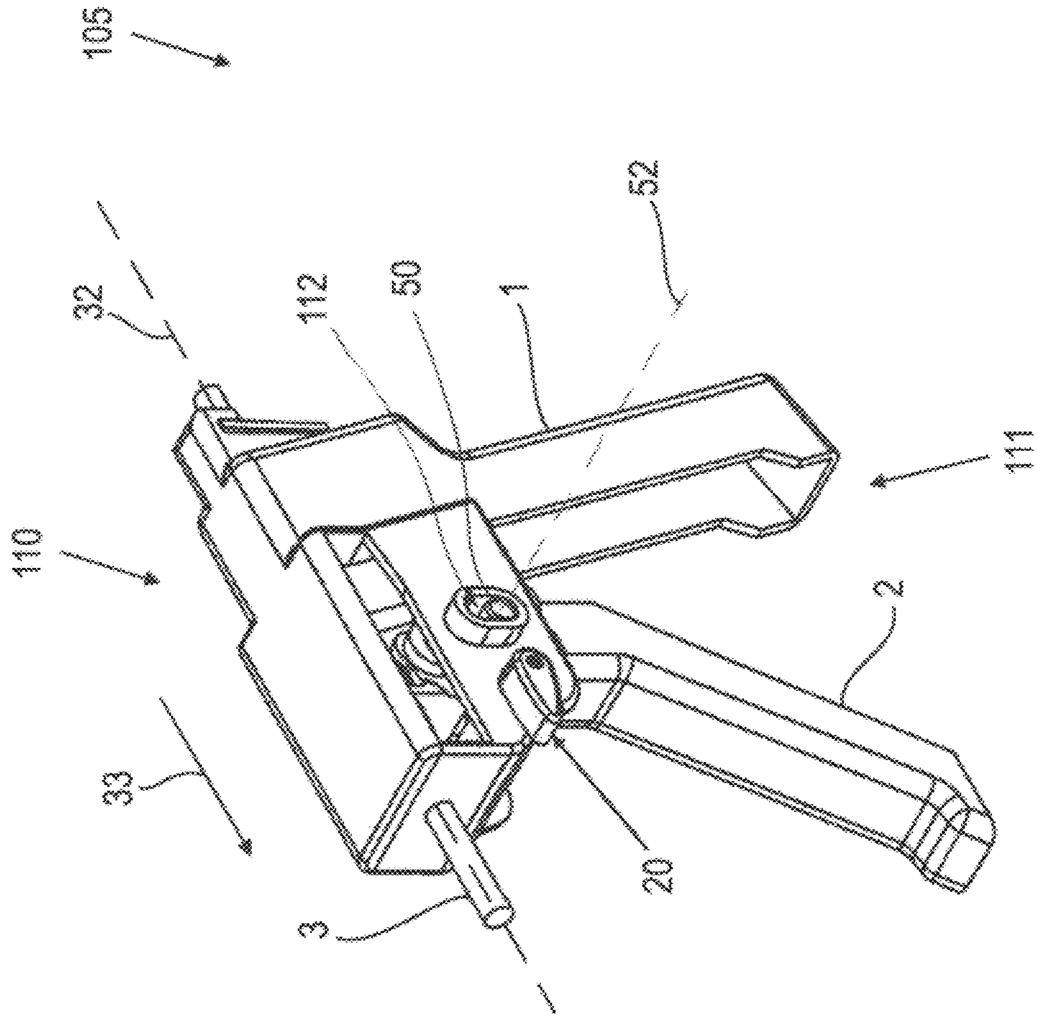
FIG. 25 illustrates a fifth dispenser according to the present disclosure.

FIG. 25 shows a fifth dispenser 105 according to the present disclosure. As far as no differences are described or apparent from the Figures, the fifth dispenser 105 is configured as it is disclosed in connection with the third dispenser 103.

With the fifth dispenser 105, the control element 20 to adjust the rotational position of the restraining members 120 is configured as a rotatable lever that is positioned at a side surface of the dispenser body 1.

Figure 26:
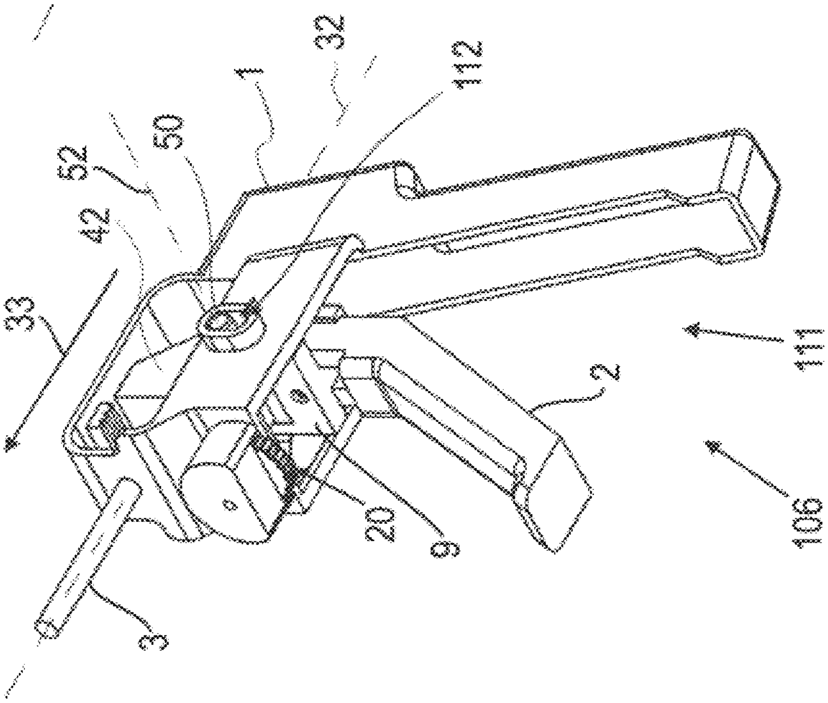
FIG. 26 illustrates a sixth dispenser according to the present disclosure.

FIG. 26 shows a sixth dispenser 106 according to the present disclosure. As far as no differences are described or apparent from the Figures, the sixth dispenser 106 is configured as it is disclosed in connection with the fourth dispenser 104.

The sixth dispenser 106 has a control element 20 that is configured as a control wheel and that adjusts the longitudinal position of the restraining members 120 along the longitudinal axis 32 upon rotation. The control element 20 is placed on a distal end of the dispenser body 1, whereby the distal end is located in the distal direction 33 from the trigger lever 2.

Figure 27:
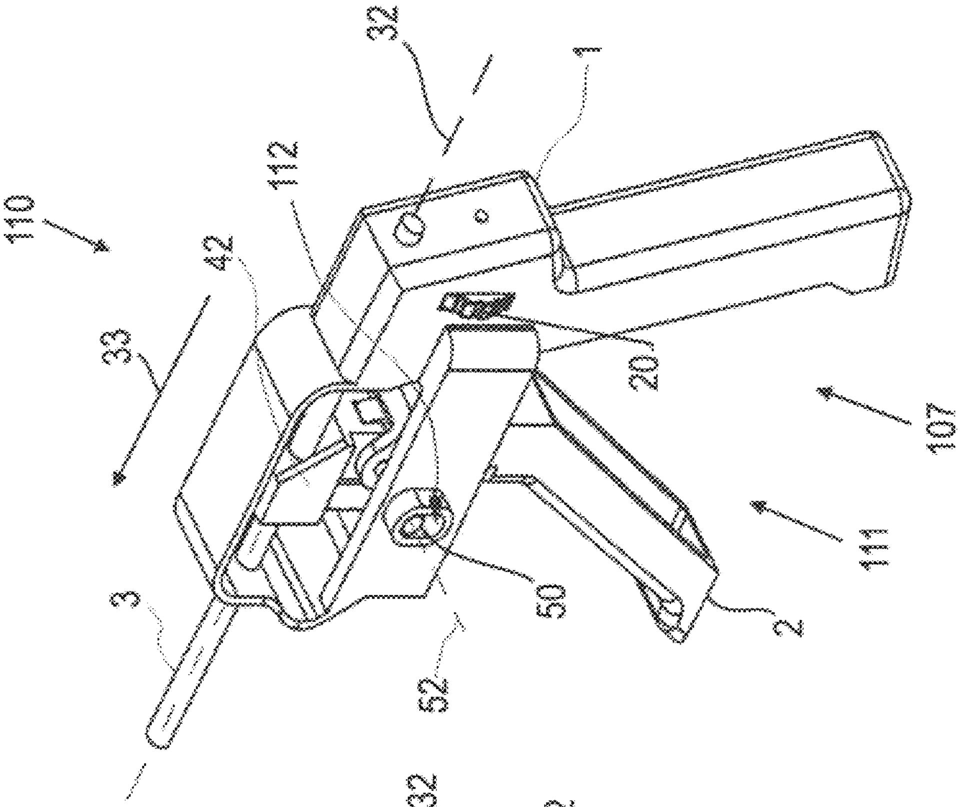
FIG. 27 illustrates a seventh dispenser according to the present disclosure.

FIG. 27 shows a seventh dispenser 107 according to the present disclosure. As far as no differences are described or apparent from the Figures, the seventh dispenser 107 is configured as it is disclosed in connection with the sixth dispenser 106. With the seventh dispenser 107, the control wheel is placed at a proximal end of the dispenser body 1, opposite to the distal end.

Figure 28:
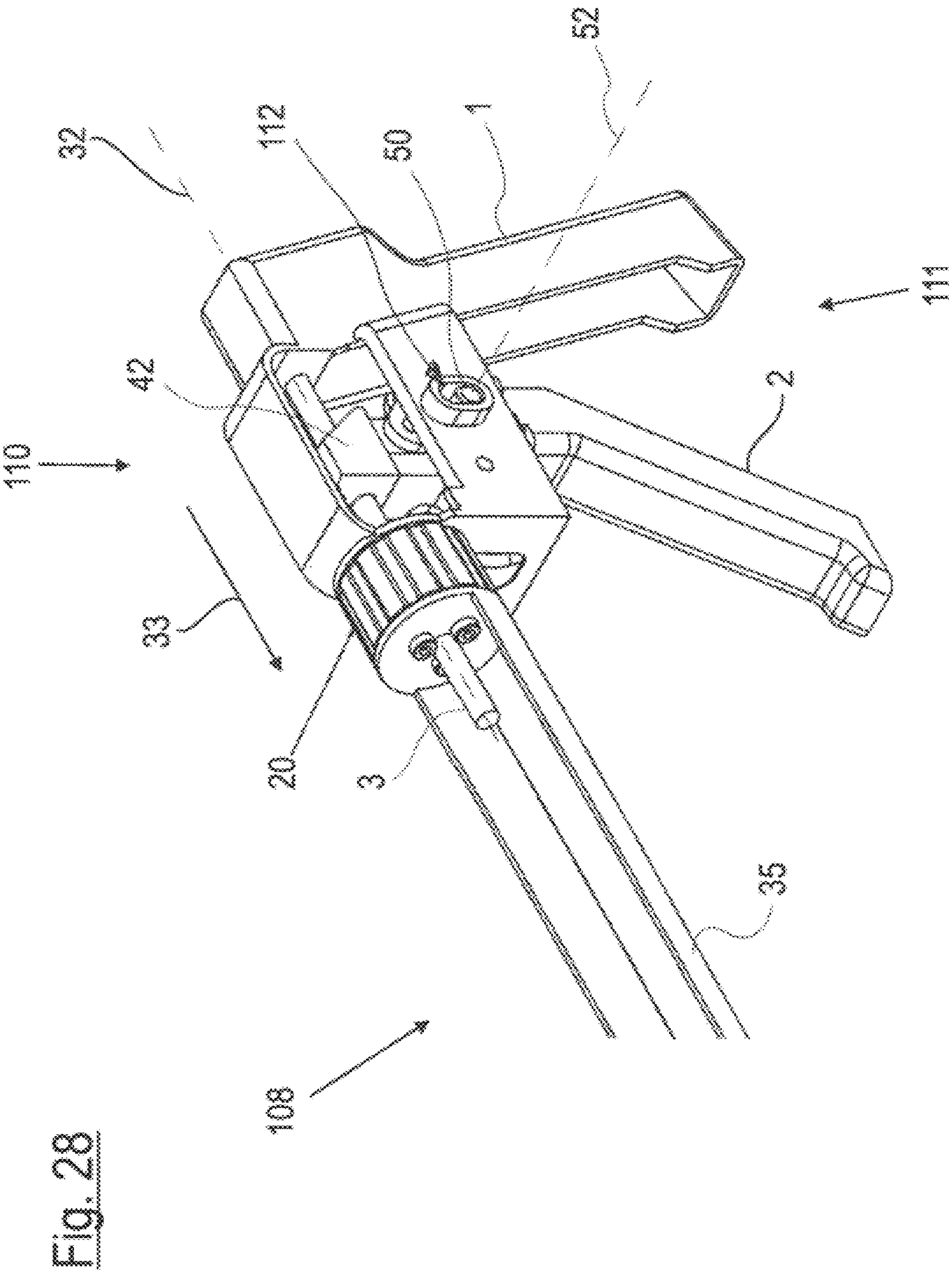
FIG. 28 illustrates an eighth dispenser according to the present disclosure.

FIG. 28 shows an eighth dispenser 108 according to the present disclosure. As far as no differences are described or apparent from the Figures, the eighth dispenser 108 is configured as it is disclosed in connection with the third dispenser 103. While the receptacle that receives the container with the material to be dispensed has been omitted from the remaining Figures, FIG. 28 exemplarily shows the receptacle 35.

The eighth dispenser 108 has a control element 20 for adjusting the rotational position of the restraining members 120 that is configured as a rotatable collar that surrounds the driving rod 3 and the longitudinal axis 32 and that is positioned between the receptacle 35 and the dispenser body 1. The rotatable collar interacts with the restraining members 120 via a cam mechanism.

Figure 29:
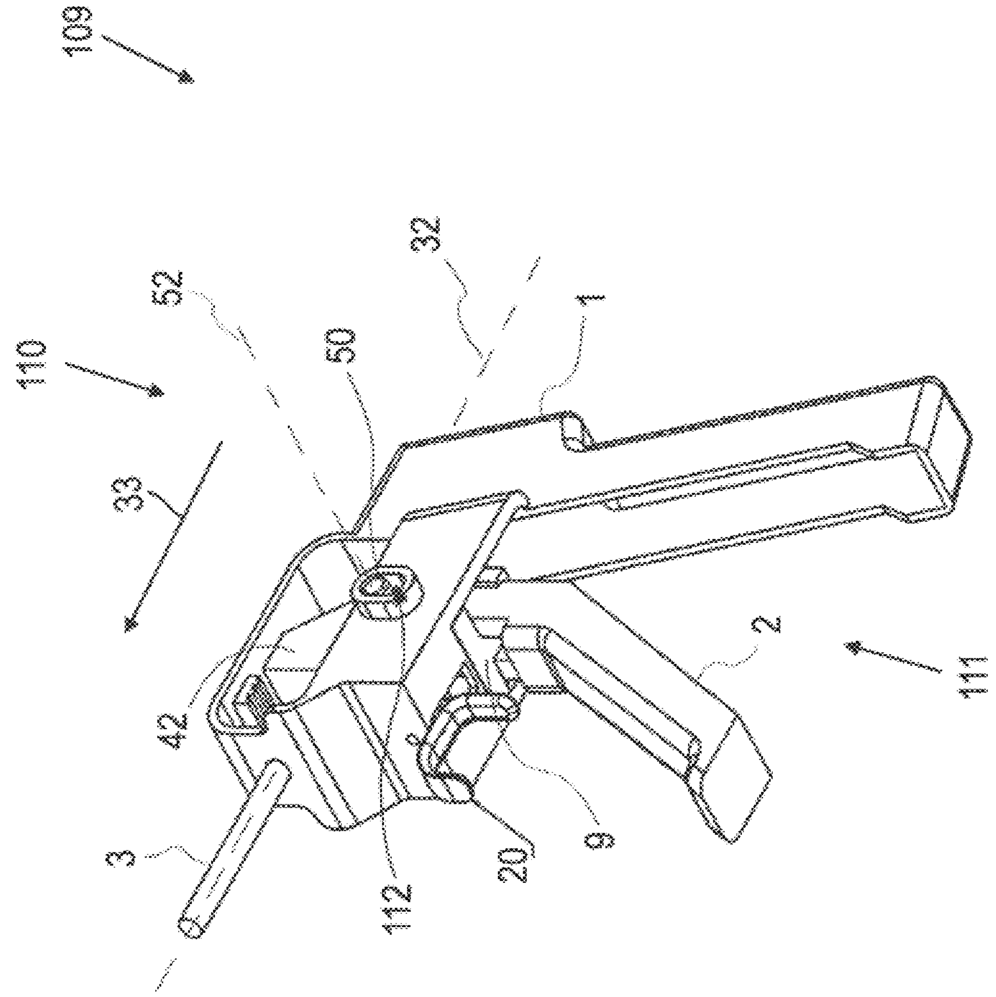
FIG. 29 illustrates a ninth dispenser according to the present disclosure.

FIG. 29 shows a ninth dispenser 109 according to the present disclosure. As far as no differences are described or apparent from the Figures, the ninth dispenser 109 is configured as it is disclosed in connection with the fourth dispenser 104.

With the ninth dispenser 109, the control element 20 for adjusting the longitudinal position of the restraining members 120 is positioned at the bottom side 111 of the dispenser body 1. The control element 20 is configured as a slider and placed in the distal direction 33 from the trigger lever 2.

Figure 31:
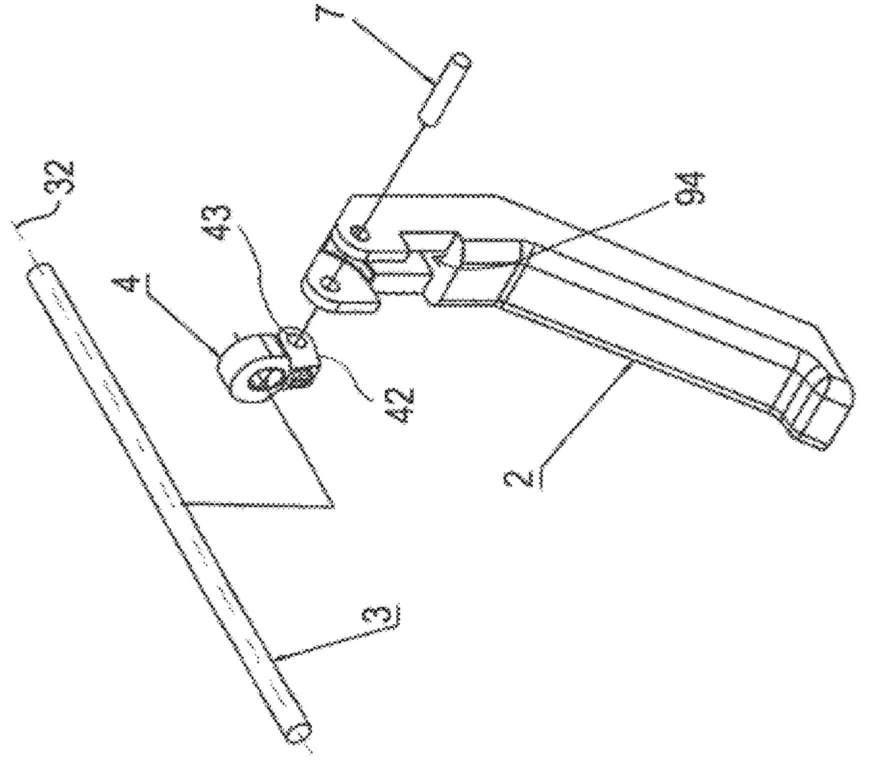
FIG. 31 illustrates an exploded view of the connection shown in FIG. 30.
Figure 30:
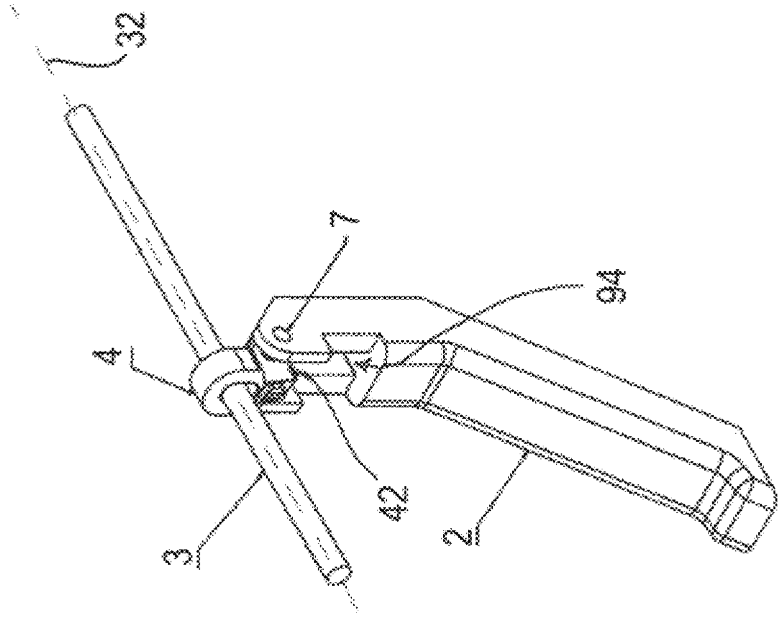
FIG. 30 illustrates a perspective view of a further embodiment of a connection member for connecting the trigger lever to the driving rod.

FIG. 30 shows a perspective view of a further embodiment of a connection member 42 for connecting the trigger lever 2 to the driving rod 3 and FIG. 31 shows an exploded view of the connection formed by this connection member 42 and the actuation member 2. In this embodiment, the connection member 42 is configured as a connection element that is integrally formed with the clamping member 4 as one piece and that is made from the same material as the clamping member 4.

The connection element is positioned at the proximal end of the clamping member 4 and comprises a seat 43 for receiving the actuation member 7 of the trigger lever 2. The seat 43 is configured as a through hole parallel to the rotation axis 52 and coaxial to holes in the trigger lever 2 that also receive the actuation member 7. In this way, the trigger lever 2 and the clamping member 4 are held together by the actuation member 7 in an assembled state.

Figure 32:
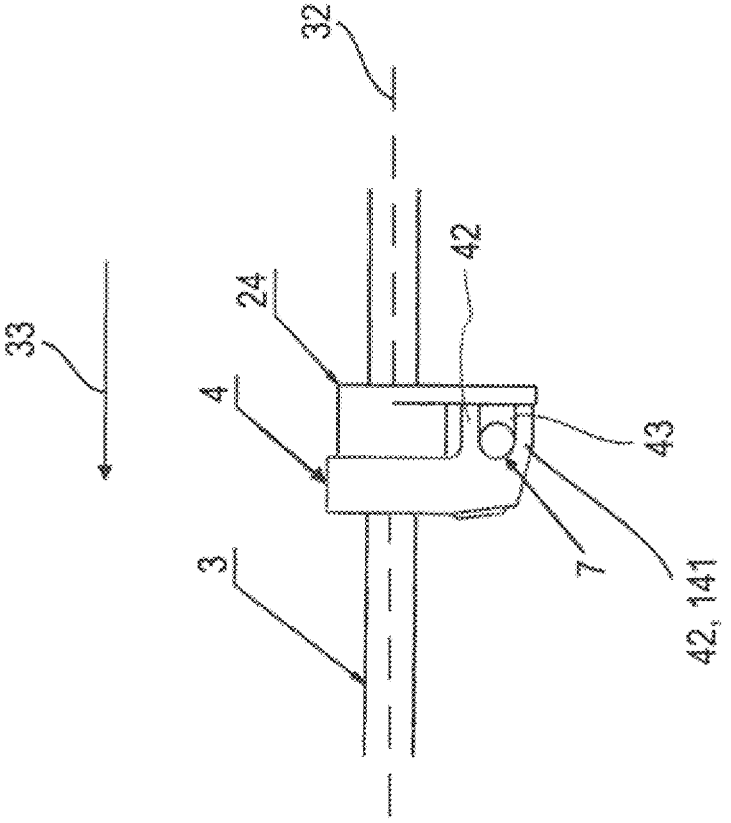
FIG. 32 illustrates a further embodiment of the connection member.

FIG. 32 shows a further embodiment of the connection member 42. Like with the embodiment shown in FIGS. 31 and 32, the connection member 42 is integrally formed with the clamping member 4. However, the seats 43 for receiving the actuation member 7 are configured as longitudinal slots that are open at a proximal end of the clamping member 4 and that are limited towards the bottom side 111 of the dispenser by two forks 141. The seats 43 are closed by a closing element 24 that is positioned proximal to the clamping member 4 along the longitudinal axis 32 and rests against the clamping member 4. The closing element 24 surrounds the longitudinal driving rod 3 and is movable with respect to the driving rod 3 along the longitudinal axis 32. The closing element 24 can be biased against the clamping member 4 by a biasing member, for example a spring similar to the spring 46 of the second dispenser 102. Compared to the connection member 42 shown in FIGS. 31 and 32, the embodiment shown in FIG. 32 enables easier assembly and simpler tooling.

With all embodiments of the connection member 42, the seat 43 can have an extent along the longitudinal axis 32 that allows for wear of the clamping member 4 over the working life of the respective dispenser. This extent can be defined by a diameter of the seat 43, for example if the seat 43 is configured as a through hole. In these cases, the diameter of the seat 43 can be oversized with respect to the diameter of the actuation member 7. The extent can also be defined by a slotted shape of the seat 43 along the longitudinal axis 32.

Figure 34:
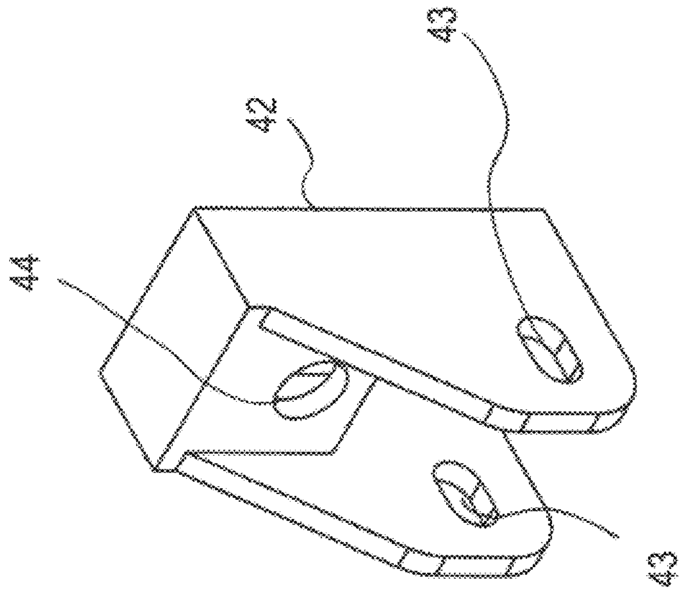
FIG. 34 illustrates a perspective view of the further embodiment of the connection member from FIG. 33
Figure 33:
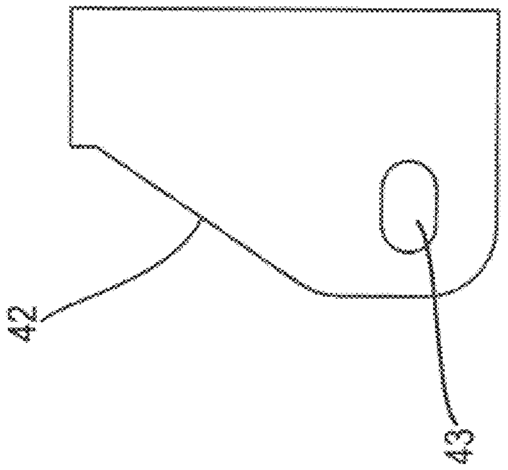
FIG. 33 illustrates a side view of a further embodiment of the connection member.

FIGS. 33 and 34 show a further embodiment of the connection member 42. As long as no differences are described or apparent from the Figures, this embodiment is configured as it is disclosed for the embodiment shown in FIGS. 18 to 20. With the embodiment shown in FIGS. 33 and 34, the seat 43 comprises longitudinal slots parallel to the longitudinal axis 32 to allow for wear of the clamping member 4. Due to the slots being parallel to the longitudinal axis 32, they keep the trigger lever 2 in the same relative position to the longitudinal rod 3 with respect to the perpendicular axis 34 over the working life of the dispenser. With other embodiments, the slots can also have an angled and/or curved slot shape.

Figure 36:
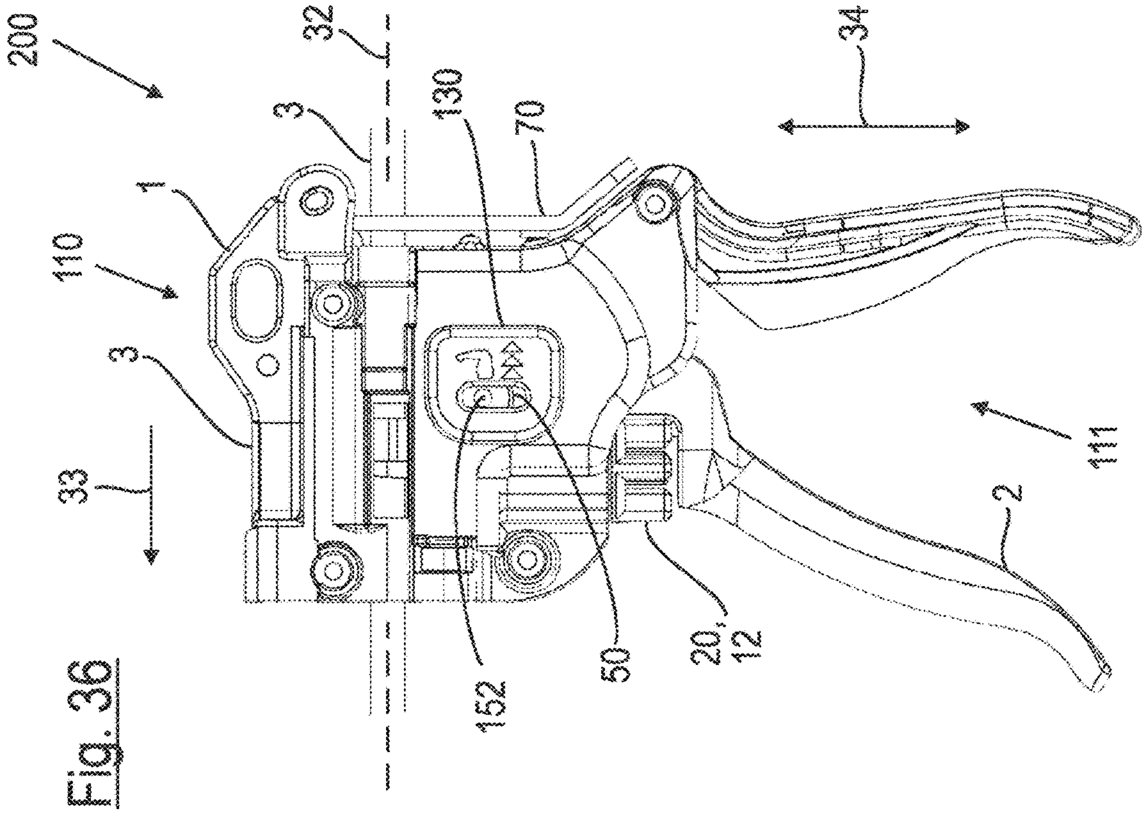
FIG. 36 illustrates a side view of the tenth dispenser.
Figure 35:
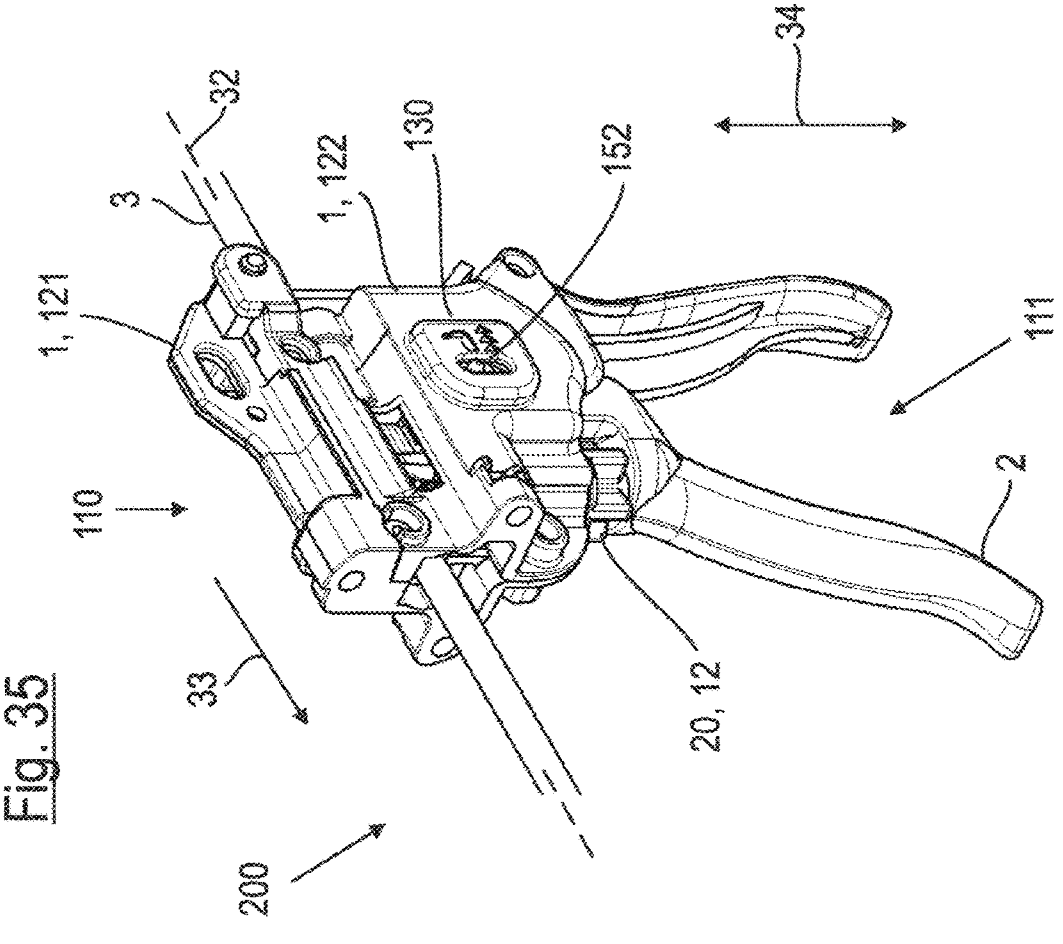
FIG. 35 illustrates a perspective view of a tenth dispenser according to the present disclosure.
Figure 37:
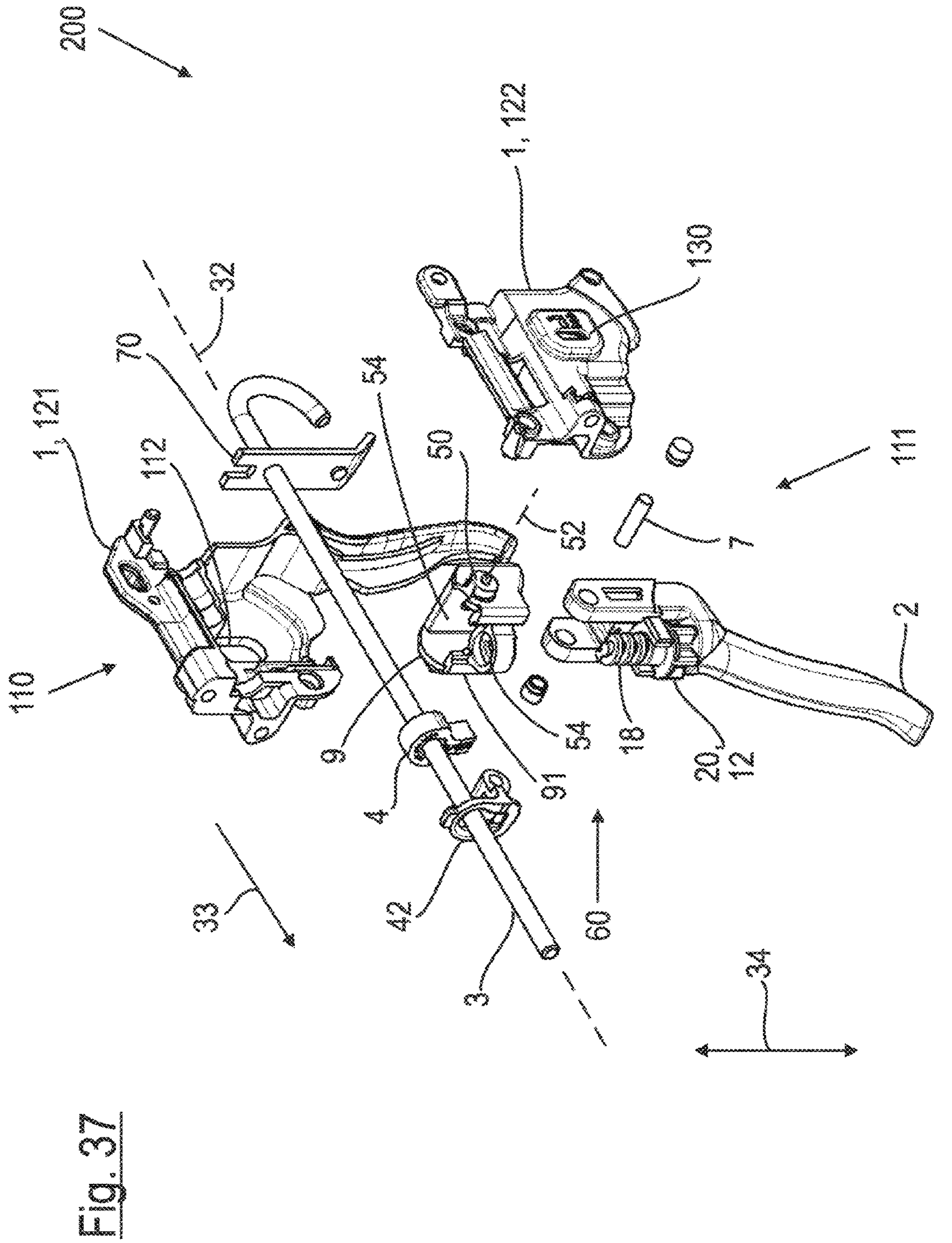
FIG. 37 illustrates an exploded view of the tenth dispenser.
Figure 39:
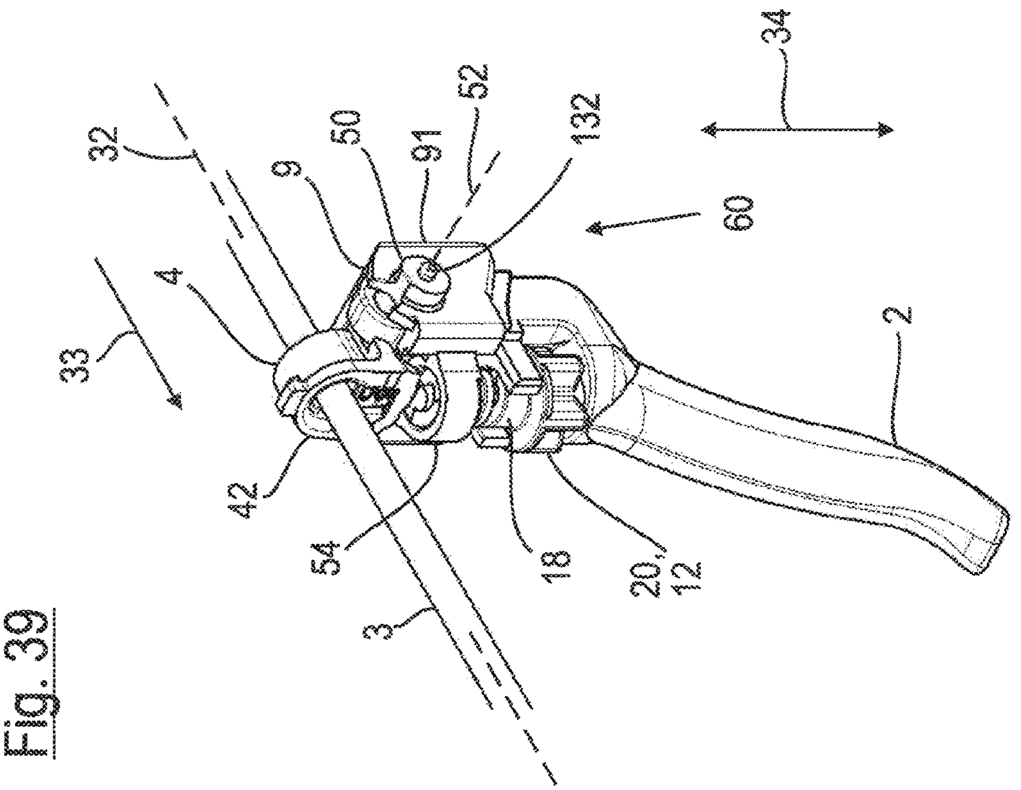
FIG. 39 illustrates a perspective view of an adjustment mechanism of the tenth dispenser.
Figure 38:
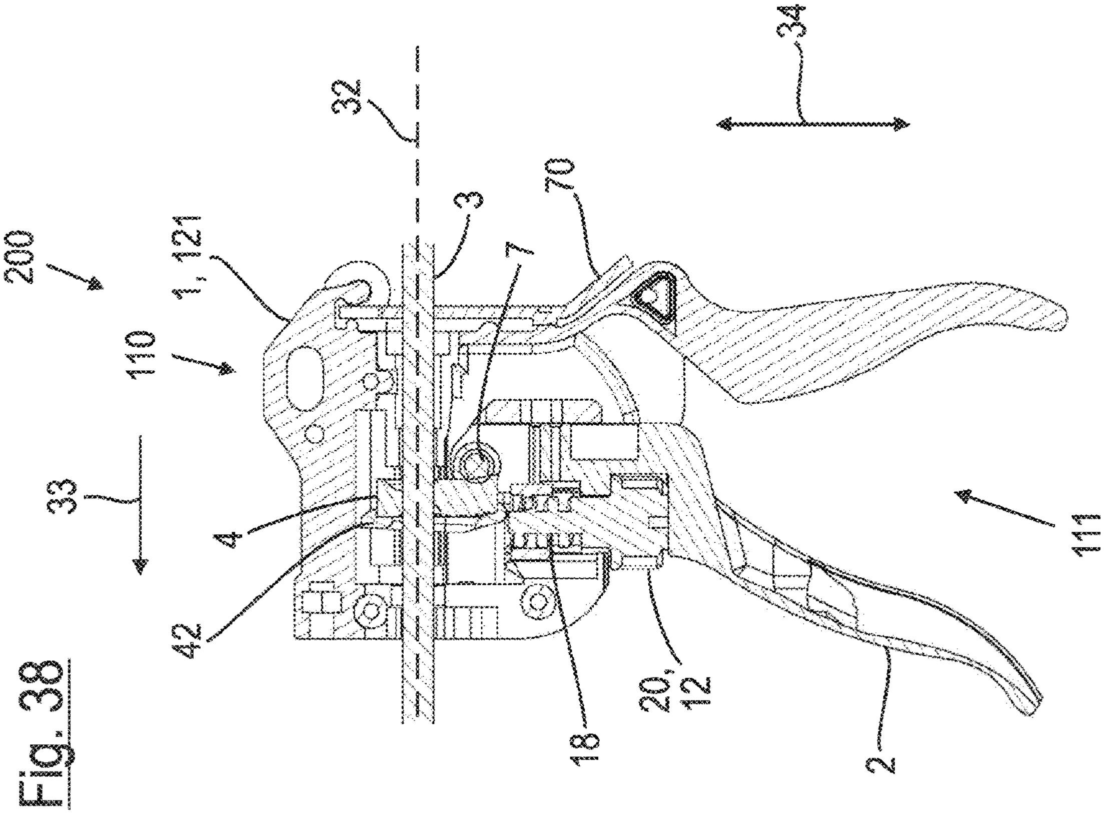
FIG. 38 illustrates a side view of a cut through the tenth dispenser.

FIG. 35 shows a perspective view of a tenth dispenser 200 according to the present disclosure, FIG. 36 shows a side view of the tenth dispenser 200, FIG. 37 an exploded view of the tenth dispenser 200, FIG. 38 a side view of a cut of the tenth dispenser 200 in a plane through the longitudinal axis 32 and the perpendicular axis 34, and FIG. 39 a perspective view of an adjustment mechanism 60 of the tenth dispenser 200. As long as no differences are described or apparent from the Figures, the tenth dispenser 200 is configured as it is disclosed in connection with the first dispenser 101.

The adjustment mechanism 60 of the tenth dispenser 200 comprises a pivot assembly 9 and a control member 20. Like with the second dispenser 102, the pivot assembly 9 has a holding element 91 that is integrally formed with the pivot members 50 of the tenth dispenser 200. The holding element 91 is configured as a carriage that slideably receives an upper part of the trigger lever 2 in a central opening 54. The pivot members 50 of the pivot assembly 9 are slideably received in elongated slots 112 that are provided on an inner surface of the dispenser body 1, see, for example, FIG. 37. In this way, the pivot members 50 are configured to slideably move with respect to the dispenser body 1 and the trigger lever 2 in a direction parallel to the perpendicular axis 34. The elongated slots 112 form longitudinal recesses of the dispenser body 1.

A longitudinal position of the pivot members 50 can be defined and adjusted by the adjustment mechanism 60. Thereby, the adjustment mechanism 60 is configured to move the pivot assembly 9 along the trigger lever 2 via a control mechanism having a rotatable control member 20 and a threaded rod 18. With the tenth dispenser 200, the adjustment mechanism 60 fixes the position of the pivot members 50 and the pivot assembly 9 with respect to the trigger lever 2 and the actuation member 7 during actuation of the trigger lever 2, while the pivot assembly 9 and the pivot members 50 are free to slideably move with respect to the dispenser body 1 during actuation of the trigger lever 2. Thereby, the pivot assembly 9 and the pivot members 50 move along the elongated slots 112 that are provided at the dispenser body 1.

The control member 20 is configured as a control thumb wheel 12. Furthermore, it is longitudinally fixed with respect to the trigger lever 2. The control member 20 is provided at an upper end of a gripping zone of the trigger lever 2, where it can be easily operated by a user of the tenth dispenser 200. Additionally, it is located in an upper portion of the trigger lever 2, the upper portion being located towards the dispenser body 1 and the driving rod 3. Furthermore, the control member 20 and the driving rod 3 are located on opposite sides of the pivot assembly 9 along the perpendicular axis 34. The control member 20 is located in a seat provided at the trigger lever 2 that holds it in place with respect to the trigger lever 2.

The threaded rod 18 is fixedly connected to the control member 20. In the present embodiment, the control member 20 and the threaded rod 18 are configured as an integral component that is formed from the same material. With other embodiments, the control member 20 and the threaded rod 18 can also be configured as separate components that are fixedly connected with each other. The pivot assembly 9 comprises a threaded opening 56 that receives and engages with the threaded rod 18. By rotating the threaded rod 18, the pivot assembly 9 is displaced with respect to the threaded rod 18 and the trigger lever 2.

Like with the second dispenser 102, the dispenser body 1 of the tenth dispenser 200 comprises a first part 121 and a second part 122 that are fastened together during assembly of the tenth dispenser 200. Furthermore, the tenth dispenser 200 comprises a break plate 70 that is also configured as it is disclosed in connection with the second dispenser 102.

The tenth dispenser 200 further comprises a display element 138 that provides a visual indication of the currently adjusted mechanical advantage to a user of the dispenser 200. The display element 130 is located at one of the longitudinal recesses 112 on an outer surface of the dispenser body 1. It has an elongated opening through which an indicator element 132 protrudes from the inside of the dispenser body 1. During adjustment of the lever distance 113 and therefore also the mechanical advantage, the indicator element 132 travels along the elongated opening of the display element 130. The display element 130 furthermore comprises markings that are provided on its outer surface and that are distributed along the elongated opening. Thereby, the individual markings represent the mechanical advantage that is set when the indicator element 132 is placed next to the respective marking.

With the tenth dispenser 200, the indicator element 132 is aligned with the rotation axis 52. Furthermore, the indicator element 152 is provided at one of the pivot members 50, namely at a top surface of the respective cylindrical pivot member 50.

Like the tenth dispenser 200, also the other dispensers 101, 102, 103, 104, 105, 106, 107, 108, 109 according to the present disclosure can have a display element that provides a visual indication of the currently adjusted mechanical advantage to a user. These display elements can be configured as it is disclosed for the display element 130 of the tenth dispenser 200.

With the tenth dispenser 200, the actuation member 7 and the trigger lever 2 are non-displaceably connected to the clamping member 4 that advances the driving rod 3 along the longitudinal axis 32 upon actuation of the trigger lever 2. Thereby, the actuation member 7 is connected to the clamping member 4 via a connection member 42.

Figure 41:
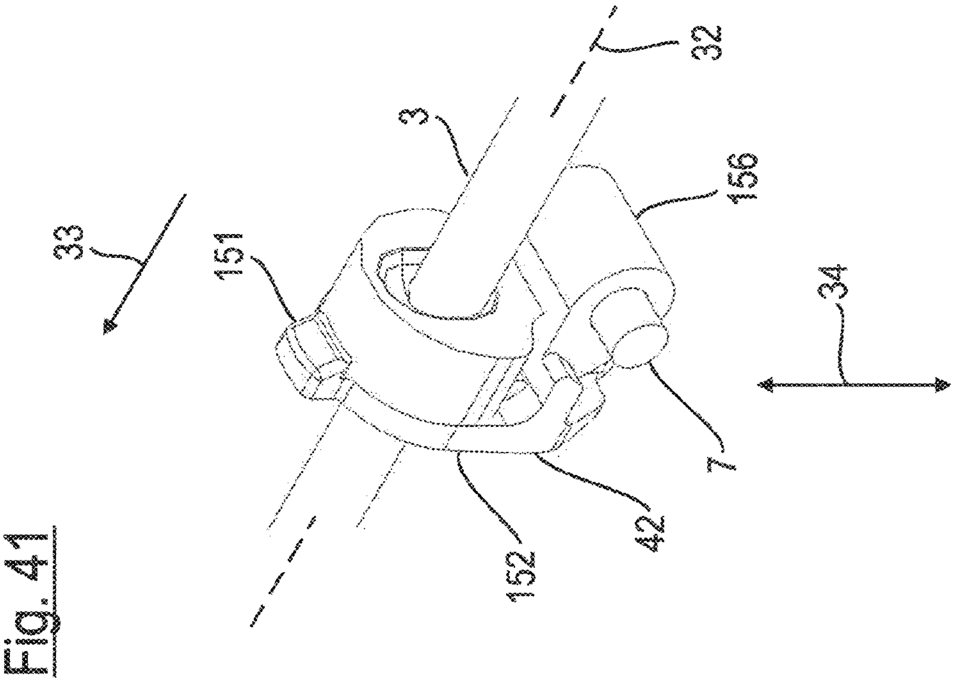
FIG. 41 illustrates a perspective rear view of the connection member and the clamping member of the tenth dispenser.
Figure 40:
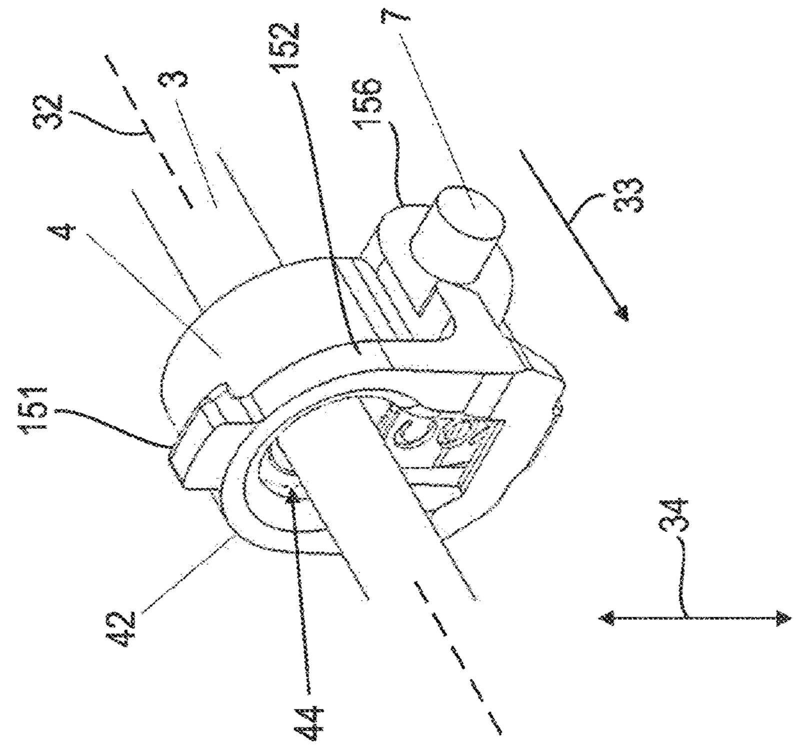
FIG. 40 illustrates a perspective front view of a connection member and a clamping member of the tenth dispenser.
Figure 43:
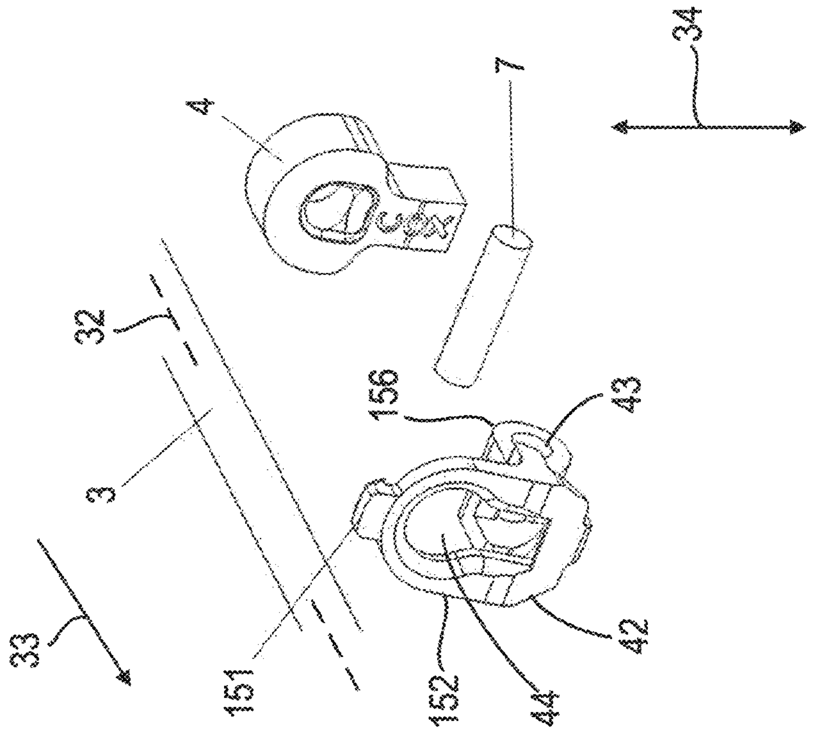
FIG. 43 illustrates an exploded front view of the connection member and the clamping member of the tenth dispenser.
Figure 42:
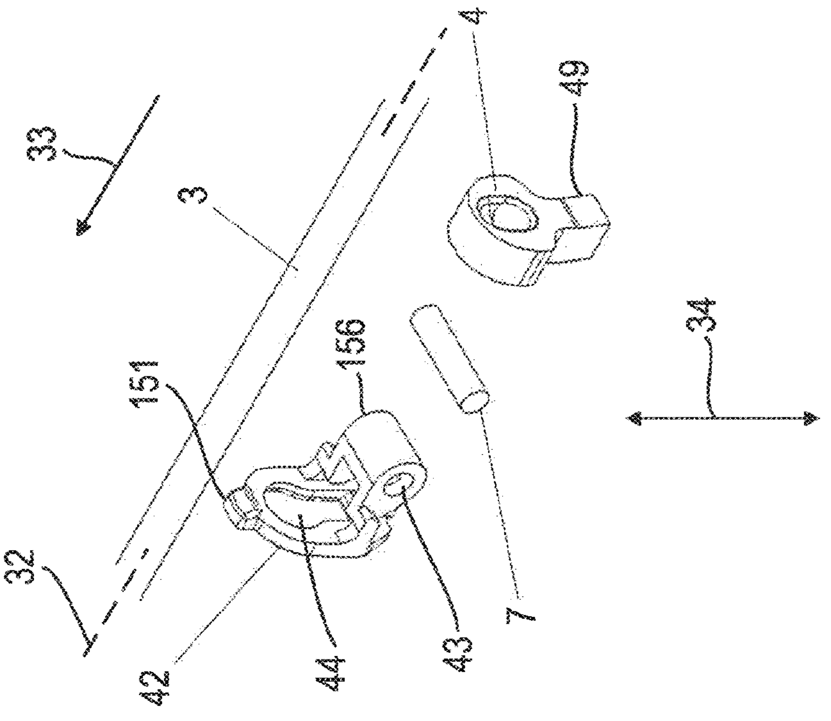
FIG. 42 illustrates an exploded rear view of the connection member and the clamping member of the tenth dispenser.
Figure 44:
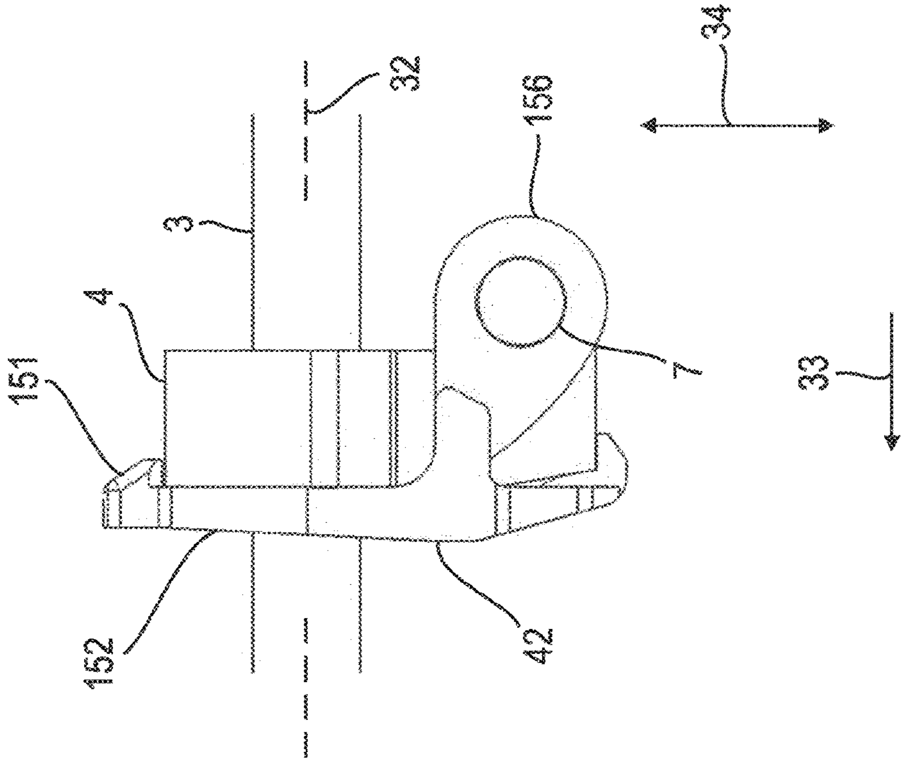
FIG. 44 illustrates a side view of the connection member and the clamping member of the tenth dispenser.

FIG. 40 shows a perspective front view of the connection member 42 and the clamping member 4, FIG. 41 a perspective rear view of the connection member 42 and the clamping member 4, FIG. 42 an exploded front view of the connection member 42 and the clamping member 4. FIG. 43 an exploded rear view of the connection member 42 and the clamping member 4, FIG. 44 a side view of the connection member 42 and the clamping member 4, FIG. 45 a side view of a cut of the connection member 42 and the clamping member 4 through the longitudinal axis 32 and the perpendicular axis 34, and FIG. 46 a perspective rear view of the connection member 42.

The connection member 42 receives the driving rod 3 in a longitudinal rod opening 44 that is orientated parallel to the longitudinal axis 32. The connection member 42 surrounds the clamping member 4 and receives the connection member 4 in a seat 154, which is shown, inter alia in FIG. 46. The seat 154 thereby surrounds a contact region 49 in which the clamping member 4 receives a force exerted by the trigger lever 2. The contact region 49 is provided in a lower section of the clamping member 4, the lower section being farther away from the driving rod 3 than an upper section surrounding the driving rod 3.

The connection member 42 is furthermore fixedly connected to the clamping member 4 by a snap-on connection. The snap-on connection exemplarily comprises a snap element 151 that engages with the upper section of the clamping member 4, while the lower section of the camping member 4 engages with the seat 154.

The actuation member 7 of the tenth dispenser 200, which is configured as a cylindrical rod or pin, is non-displaceably connected to the clamping member 4 by a connection element 156 of the connection member 42. The connection element 156 is positioned at the proximal end of the clamping member 4 and comprises a seat 43 for receiving the actuation member 7 of the trigger lever 2. The seat 43 is configured as a through hole parallel to the rotation axis 52 and coaxial with holes in the trigger lever 2 that also receive the actuation member 7. In this way, the trigger lever 2 and the clamping member 4 are connected with each other via the connection member 41 and the actuation member 7 in an assembled state.

Figure 45:
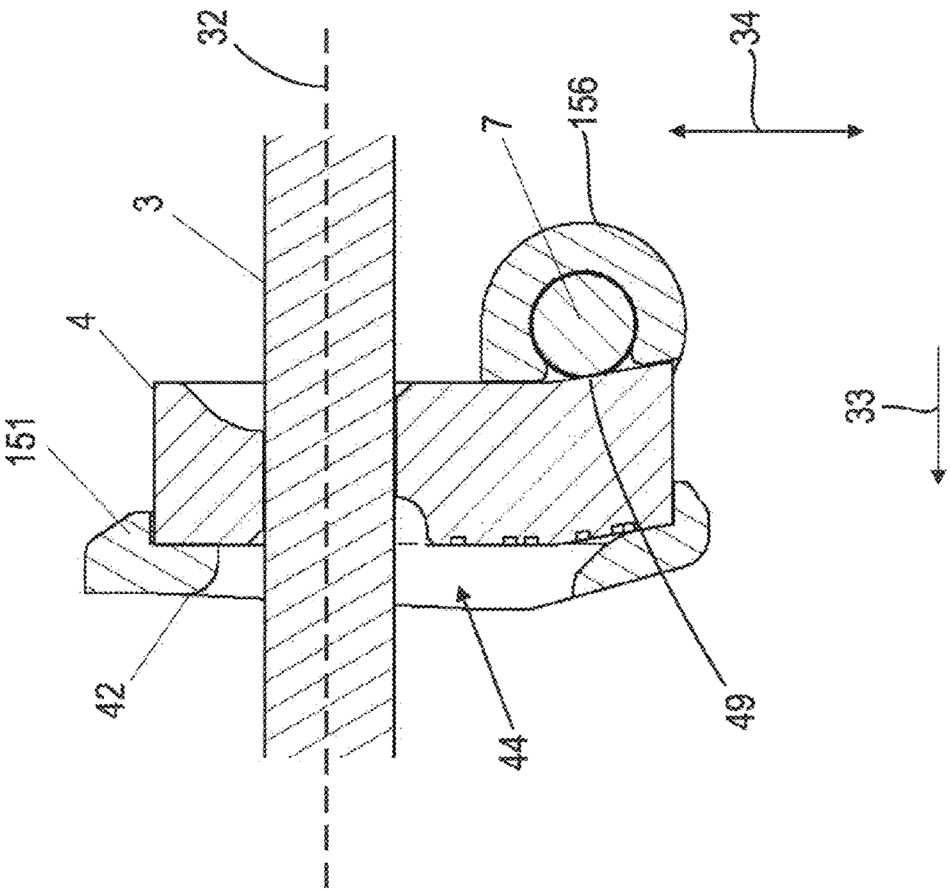
FIG. 45 illustrates a side view of a cut through the connection member and the clamping member of the tenth dispenser.
Figure 46:
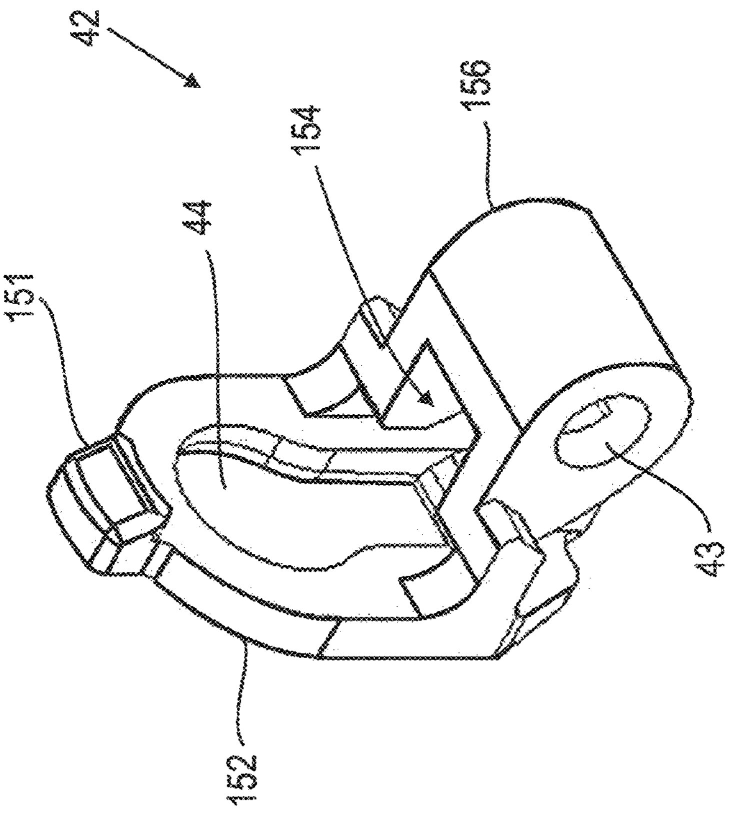
FIG. 46 illustrates a perspective rear view of the connection member of the tenth dispenser.

As can, inter alia, be seen from FIG. 45, the actuation member 7 is configured to directly contact the clamping member 4 in the contact region 49 through an opening provided in the connection element 156. With alternative embodiments, the actuation member 7 can also be configured to contact the clamping member 4 via a roller. In these cases, the connection member 42 can be additionally configured as a roller holder.

With all embodiments of the dispensers according to the present disclosure, the movement of the pivot members 50 with respect to the trigger lever 2 and/or the dispenser body 1 during adjustment of the lever distance 113 involves a displacement of the pivot members 50 with respect to the trigger lever 2 and/or the dispenser body 1. Furthermore, the pivot members 50 are translationally fixed to at least one, such as exactly one, of the trigger lever 2 and the dispenser body 1 upon actuation of the trigger lever 2 during dispensing. With all embodiments, the pivot members 50 can be rotationally movable with respect to the trigger lever 2 and/or the dispenser body 1 during dispensing. For example, the pivot members 50 can be rotatably received in both a seat, such as a slot or through hole, provided at the trigger lever 2 and another seat, such as a slot or through hole, provided at the dispenser body 1. Such pivot members 50 can, for example, be configured as cylindrical rods or pins.

With all embodiments of dispensers 101, 102, 103, 104, 105, 106, 107, 108, 109, 200 according to the present disclosures that are described in connection with the foregoing Figures, the adjustment mechanism 60 can be replaced by a non-displaceable connection between the pivot member 50 and the trigger lever 2 (for example with the first and tenth dispensers 101, 200) or by a non-displaceable connection between the pivot member 50 and the dispenser body 1 (for example with the second to ninth dispensers 102, 103, 104, 105, 106, 107, 108, 109). Alternatively, the pivot member 50 can be non-displaceably connected to both the trigger lever 2 and the dispenser body 1. This then results in dispensers that have a fixed mechanical advantage and in which the actuation member 7 has a connection to the driving rod 3 that is separate from the pivot member 50.

In all these cases, the connection member 8, 42 can restrict or prohibit relative movement between the driving rod 3 and the actuation member 7 along the perpendicular axis 34 and/or the longitudinal axis 32. The connection member 8, 42 can be configured as it is disclosed, for example, in connection with the connection members 8, 42 of the second dispenser 102 or the connection members 42 shown in FIGS. 32 to 34, all of which allow for a restricted relative movement between the driving rod 3 and the actuation member 7 along the perpendicular axis 34 and/or the longitudinal axis 32.

Embodiments of dispensers according to the present disclosure comprise:

1. A dispenser (101, 102, 103, 104, 105, 106, 107, 108, 109, 200) for dispensing materials, comprising
   a dispenser body (1) having a receptacle (35) for a container that holds the material,
   a driving rod (3) movable relative to the dispenser body (1) along a longitudinal axis (32) and into the receptacle (35),
   a trigger lever (2) having an actuation member (7) for displacing the driving rod (3) along the longitudinal axis (32) upon rotation of the trigger lever (2) around a rotation axis (52),
   a pivot member (50) that rotatably connects the trigger lever (2) to the dispenser body (1) and defines the rotation axis (52),
   wherein the pivot member (50) is movable connected to the trigger lever (2) in such a way that a lever distance (113) between the rotation axis (52) and the actuation member (7) changes upon movement of the pivot member (50) relative to the trigger lever (2),
   wherein the dispenser (101, 102, 103, 104, 105, 106, 107, 108, 109, 200) comprises an adjustment mechanism (60) for adjusting a mechanical advantage (A:B) of the trigger lever (2) by changing the lever distance (113),
   wherein the adjustment mechanism (60) is configured to adjustably fix the lever distance (113) to at least a minimum distance and a maximum distance.
2. Dispenser (101, 102, 103, 104, 105, 106, 107, 108, 109, 200) according to embodiment 1,
   wherein the adjustment mechanism (60) is configured to fix the lever distance (113) to one or more intermediate distances between the minimum and maximum distance, wherein, for example, the adjustment mechanism (60) is configured to fix the lever distance (113) to any intermediate distance between the minimum and maximum distance.
3. Dispenser (101, 102, 103, 104, 105, 106, 107, 108, 109, 200) according to any of the preceding embodiments,
   wherein the adjustment mechanism (60) is configured to adjust the mechanical advantage (A:B) to a range between 7:1 and 24:1, for example to a range between 12:1 and 24:1, by changing the lever distance (113).
4. Dispenser (101, 102, 103, 104, 105, 106, 107, 108, 109, 200) according to any of the preceding embodiments,
   wherein the pivot member (50) comprises at least one connection pin that is slideably received in an elongated slot (112) of the dispenser body (1).
5. Dispenser (101, 102, 103, 104, 105, 106, 107, 108, 109, 200) according to any of the preceding embodiments,
   wherein the pivot member (50) is movable connected to the dispenser body (1) and movable in a moving direction that has an angle with the longitudinal axis (32),
   wherein, for example, the moving direction of the pivot member (50) is at least essentially perpendicular to the longitudinal axis (32) and/or the rotation axis (52).
6. Dispenser (101, 102, 103, 104, 105, 106, 107, 108, 109, 200) according to any of the preceding embodiments,
   wherein the trigger lever (2) is connected, for example via the actuation member (7), to the driving rod (3) to limit perpendicular movement of the trigger lever (2) along a perpendicular axis (32) perpendicular to the longitudinal axis (32) and perpendicular to the rotation axis (52).
7. Dispenser (101, 102, 103, 104, 105, 106, 107, 108, 109, 200) according to embodiment 6,
   wherein the perpendicular movement of the trigger lever (2) relative to the driving rod (3) is limited via a connection member (8, 42) that is connected to the driving rod (3).
8. Dispenser (101, 102, 103, 104, 105, 106, 107, 108, 109, 200) according to embodiment 7,
   wherein the connection member (8, 42) is configured to tighten the trigger lever towards the driving rod (3).
9. Dispenser (101, 102, 103, 104, 105, 106, 107, 108, 109, 200) according to at least one of the preceding embodiments,
   further comprising a clamping member (4) that is configured to advance the driving rod (3) by clamping the drive rod (3) upon tilting perpendicular to the longitudinal axis (23),
   wherein the actuation member (7) directly contacts the clamping member (4).
10. Dispenser (101, 102, 103, 104, 105, 106, 107, 108, 109, 200) according to at least one of embodiments 1 to 8,
    further comprising a clamping member (4) that is configured to advance the driving rod (3) by clamping the driving rod (3) upon tilting perpendicular to the longitudinal axis (23),
    wherein the actuation member (7) contacts the clamping member (4) via a roller (6) that is rotatably mounted on the actuation member (7),
    wherein, for example, the actuation member (7) is attached to the driving rod (3) via a roller holder (8) that receives the actuation member (7) in at least one opening (43).
11. Dispenser (101, 102, 103, 104, 105, 106, 107, 108, 109, 200) according to any one of the preceding embodiments,
    wherein the pivot member (50) is movable with respect to the trigger lever (2) during operation of the trigger lever (2).
12. Dispenser (102, 103, 104, 105, 106, 107, 108, 109) according to any of the preceding embodiments,
    wherein the adjustment mechanism (60) is supported at the dispenser body (1) and is configured to restrain movement of the pivot member (50) relative to the dispenser body (1).
13. Dispenser (102, 103, 104, 105, 106, 107, 108, 109) according to embodiment 12, wherein the adjustment mechanism (60) comprises an adjustable restraining member (120), which is configured to define a position of the pivot member (50) with respect to the dispenser body (1), for example perpendicular to the longitudinal axis (32).
14. Dispenser (102, 103, 104, 105, 106, 107, 108, 109) according to embodiment 13, wherein the restraining member (120) is slideably connected to the dispenser body (1) along a moving direction, wherein, for example, the moving direction is parallel to a moving direction of the pivot member (50) with respect to the dispenser body (1).

15. Dispenser (101, 102, 103, 104, 105, 106, 107, 108, 109, 200) according to any one of the preceding embodiments, wherein the adjustment mechanism (60) comprises a control member (12, 20), such as a rotatable control member, to adjust the lever distance (113), wherein, for example, the control member (12, 20) is located at the dispenser body (1), such as at a top side (110) of the dispenser body (1) opposite to a bottom side (111) of the dispenser body (1) at which the trigger lever (2) is arranged.

An additional embodiment of a dispenser according to the present disclosure comprises:

1. A dispenser (101, 102, 103, 104, 105, 106, 107, 108, 109, 200) for dispensing materials, comprising a dispenser body (1) having a receptacle (35) for a container that holds the material, a driving rod (3) movable relative to the dispenser body (1) along a longitudinal axis (32) and into the receptacle (35), a trigger lever (2) having an actuation member (7) for displacing the driving rod (3) along the longitudinal axis (32) upon rotation of the trigger lever (2) around a rotation axis (52), a pivot member (50) that rotatably connects the trigger lever (2) to the dispenser body (1) and defines the rotation axis (52), wherein the pivot member (50) is movable connected to the trigger lever (2) in such a way that a lever distance (113) between the rotation axis (52) and the actuation member (7) changes upon movement of the pivot member (50) relative to the trigger lever (2), wherein the dispenser (101, 102, 103, 104, 105, 106, 107, 108, 109, 200) comprises an adjustment mechanism (60) for adjusting a mechanical advantage (A:B) of the trigger lever (2) by changing the lever distance (113), wherein the pivot member (50) is slideably connected to the dispenser body (1).

In addition, all further embodiments that are disclosed in connection with the dispensers according to the present disclosure also apply to the foregoing embodiment.

Other embodiments of dispensers according to the present disclosure comprise the following:

1. A dispenser (101, 102, 103, 104, 105, 106, 107, 108, 109, 200) for dispensing materials, comprising a dispenser body (1) having a receptacle (35) for a container that holds the material, a driving rod (3) movable relative to the dispenser body (1) along a longitudinal axis (32) and into the receptacle (35), a trigger lever (2) having an actuation member (7) for displacing the driving rod (3) along the longitudinal axis (32) upon rotation of the trigger lever (2) around a rotation axis (52), a pivot member (50) that rotatably connects the trigger lever (2) to the dispenser body (1) and defines the rotation axis (52), wherein the trigger lever (2) has a connection to the driving rod (3), for example via the actuation member (7), that limits perpendicular movement of the trigger lever (2) along a perpendicular axis (32), wherein the perpendicular axis (32) is orientated perpendicular to the longitudinal axis (32) and perpendicular to the rotation axis (52), wherein the connection of the trigger lever (2) to the driving rod (3) is separate from the pivot member (50).

2. Dispenser (101, 102, 103, 104, 105, 106, 107, 108, 109, 200) according to embodiment 1, wherein the perpendicular movement of the trigger lever (2) relative to the driving rod (3) is limited via a connection member (8, 42) that is connected to the driving rod (3).

3. Dispenser (101, 102, 103, 104, 105, 106, 107, 108, 109, 200) according to embodiment 2, wherein the connection member (8, 42) is movably attached to the driving rod (3).

4. Dispenser (101, 102, 103, 104, 105, 106, 107, 108, 109, 200) according to at least one of the preceding embodiments, further comprising a clamping member (4) that is configured to advance the driving rod (3) by clamping the driving rod (3) upon tilting perpendicular to the longitudinal axis (23), wherein the clamping member (4) is configured to receive a force transmitted by the actuation member (7) at a fixed location during operation of the trigger lever (2).

5. Dispenser (101, 102, 103, 104, 105, 106, 107, 108, 109, 200) according to embodiment 4, wherein the actuation member (7) is non-displaceably connected to the clamping member (4).

6. Dispenser (101, 102, 103, 104, 105, 106, 107, 108, 109, 200) according to embodiment 5, wherein the actuation member (7) is non-displaceably connected to the clamping member (4) via a connection member (6, 42) that is fixedly connected to the clamping member (4), for example via a snap on connection.

7. Dispenser (101, 102, 103, 104, 105, 106, 107, 108, 109, 200) according to any of the preceding embodiments, wherein a movement of the actuation member (7) with respect to the dispenser body (1) during actuation of the trigger lever (2) deviates from a pure rotation around the rotation axis (52).

8. Dispenser (101, 102, 103, 104, 105, 106, 107, 108, 109, 200) according to any of the preceding embodiments, wherein the rotation axis (52) defined by the pivot member (50) is displaceable with respect to the dispenser body (1) and/or the actuation member (7) during actuation of the trigger lever (2).

In addition, all further embodiments that are disclosed in connection with the dispensers according to the present disclosure also apply to the foregoing embodiments.

Other embodiments of dispensers according to the present disclosure comprise the following:

1. A dispenser (101, 102, 103, 104, 105, 106, 107, 108, 109, 200) for dispensing materials, comprising a dispenser body (1) having a receptacle (35) for a container that holds the material, a driving rod (3) movable relative to the dispenser body (1) along a longitudinal axis (32) and into the receptacle (35), a trigger lever (2) having an actuation member (7) for displacing the driving rod (3) along the longitudinal axis (32) upon rotation of the trigger lever (2) around a rotation axis (52), a pivot member (50) that rotatably connects the trigger lever (2) to the dispenser body (1) and defines the rotation axis (52), wherein the actuation member (7) has a connection to the driving rod (3), wherein the connection is separate from the pivot member (50).

2. Dispenser (101, 102, 103, 104, 105, 106, 107, 108, 109, 200) according to embodiment 1, wherein the connection of the actuation member (7) to the driving rod (3) limits perpendicular movement of the actuation member (7) relative to the driving rod (3) along a perpendicular axis (32), wherein the perpendicular axis (32) is orientated perpendicular to the longitudinal axis (32) and perpendicular to the rotation axis (52).

3. Dispenser (101, 102, 103, 104, 105, 106, 107, 108, 109, 200) according to at least one of the preceding embodiments, wherein the trigger lever (2) has a connection to the driving rod (3), for example via the actuation member (7), that limits perpendicular movement of the trigger lever (2) along a perpendicular axis (32), wherein the perpendicular axis (32) is orientated perpendicular to the longitudinal axis (32) and perpendicular to the rotation axis (52).

4. Dispenser (101, 102, 103, 104, 105, 106, 107, 108, 109, 200) according to at least one of the preceding embodiments, wherein the actuation member (7) is connected to the driving rod (3) via a connection member (8, 42).

5. Dispenser (101, 102, 103, 104, 105, 106, 107, 108, 109, 200) according to embodiment 4, wherein the connection member (8, 42) is movably attached to the driving rod (3), for example displaceably, such as displaceably along the longitudinal axis (32).

6. Dispenser (101, 102, 103, 104, 105, 106, 107, 108, 109, 200) according to at least one of the preceding embodiments, further comprising a driving member, such as a clamping member (4), that is configured to advance the driving rod (3), for example by clamping the driving rod (3) upon tilting perpendicular to the longitudinal axis (23), wherein the driving member is configured to receive a force transmitted by the actuation member (7) at a fixed location during operation of the trigger lever (2).

7. Dispenser (101, 102, 103, 104, 105, 106, 107, 108, 109, 200) according to embodiment 6, wherein the actuation member (7) is non-displaceably connected to the driving member.

8. Dispenser (101, 102, 103, 104, 105, 106, 107, 108, 109, 200) according to embodiment 7, wherein the actuation member (7) is non-displaceably connected to the driving member via a connection member (6, 42) that is fixedly connected to the driving member, for example via a snap on connection.

9. Dispenser (101, 102, 103, 104, 105, 106, 107, 108, 109, 200) according to at least one of the preceding embodiments, wherein a movement of the actuation member (7) with respect to the dispenser body (1) during actuation of the trigger lever (2) deviates from a pure rotation around the rotation axis (52).

10. Dispenser (101, 102, 103, 104, 105, 106, 107, 108, 109, 200) according to at least one of the preceding embodiments, wherein the rotation axis (52) defined by the pivot member (50) is displaceable with respect to one of the dispenser body (1) and the actuation member (7) and non-displaceable with respect to the other one of the dispenser body (1) and the actuation member (7) during actuation of the trigger lever (2).

11. Dispenser (101, 102, 103, 104, 105, 106, 107, 108, 109, 200) according to embodiment 10, wherein the pivot member (50) is displaceably connected to one of the dispenser body (1) and the actuation member (7) and non-displaceably connected to the other one of the dispenser body (1) and the actuation member (7) during actuation of the trigger lever (2).

12. Dispenser (101, 102, 103, 104, 105, 106, 107, 108, 109, 200) according to at least one of embodiments 1 to 9, wherein the rotation axis (52) defined by the pivot member (50) is fixed with respect to both the dispenser body (1) and the actuation member (7) during actuation of the trigger lever (2).

In addition, all further embodiments that are disclosed in connection with the dispensers according to the present disclosure also apply to the foregoing embodiments.

The invention claimed is:

1. A dispenser for dispensing materials, comprising:

a dispenser body having a receptacle for a container configured to hold the material;

a driving rod movable relative to the dispenser body along a longitudinal axis and into the receptacle;

a trigger lever having an actuation member configured to displace the driving rod along the longitudinal axis upon rotation of the trigger lever around a rotation axis;

a pivot member that rotatably connects the trigger lever to the dispenser body and defines the rotation axis; and the pivot member movably connected to the trigger lever such that a lever distance between the rotation axis and the actuation member changes upon movement of the pivot member relative to the trigger lever, the dispenser comprising an adjustment mechanism to adjust a mechanical advantage of the trigger lever by changing the lever distance, the adjustment mechanism configured to adjustably fix the lever distance to at least a minimum distance and a maximum distance, and a position of the actuation member relative to the driving rod or the dispenser body does not change when the lever distance is changed.

2. A dispenser according to claim 1, wherein the adjustment mechanism is configured to fix the lever distance to one or more intermediate distances between the minimum and maximum distance.

3. A dispenser according to claim 1 wherein the adjustment mechanism is configured to adjust the mechanical advantage to a range between 7:1 and 24:1.

4. A dispenser according to claim 1, wherein the pivot member is slideably connected to the dispenser body.

5. A dispenser according to claim 4, wherein the pivot member is movable in a moving direction that is perpendicular to the longitudinal axis or the rotation axis.

6. A dispenser according to claim 4, wherein the pivot member comprises at least one connection element that is slideably received in an elongated slot disposed in the dispenser body.

7. A dispenser according to claim 4, wherein the pivot member is configured to be displaced with respect to the dispenser body during actuation of the trigger lever.

8. A dispenser according to claim 4, wherein the pivot member is movable in a moving direction that forms an angle with the longitudinal axis.

9. A dispenser according to claim 1, wherein the trigger lever has a connection to the driving rod, that limits perpendicular movement of the trigger lever along a perpendicular axis perpendicular to the longitudinal axis and perpendicular to the rotation axis.

10. A dispenser according to claim 9, wherein the connection of the trigger lever to the driving rod is separate from the pivot member.

11. A dispenser according to claim 9, wherein the perpendicular movement of the trigger lever relative to the driving rod is limited via a connection member that is connected to the driving rod.

12. A dispenser according to claim 11, wherein the connection member is movably attached to the driving rod.

13. A dispenser according to claim 1, further comprising a clamping member configured to advance the driving rod by clamping the driving rod, and the clamping member is configured to receive a force transmitted by the actuation member at a fixed location during operation of the trigger lever.

14. A dispenser according to claim 13, wherein the actuation member is non-displaceably connected to the clamping member.

15. A dispenser according to claim 14, wherein the actuation member is non-displaceably connected to the clamping member via a connection member fixedly connected to the clamping member.

16. A dispenser according to claim 1, wherein movement of the actuation member with respect to the dispenser body during actuation of the trigger lever is configured to deviate from a pure rotation around the rotation axis.

17. A dispenser according to claim 1 wherein the rotation axis defined by the pivot member is displaceable with respect to the dispenser body or the actuation member during actuation of the trigger lever.

18. A dispenser according to claim 1, wherein the pivot member is fixed with respect to the actuation member during operation of the trigger lever.

19. A dispenser according to claim 1, wherein the adjustment mechanism is supported at the trigger lever and is configured to restrain movement of the pivot member relative to the trigger lever.

20. A dispenser according to claim 19, wherein the adjustment mechanism comprises a threaded rod configured to act between the pivot member and the actuation member and move the pivot member relative to the actuation member.

* * * * *